United States Patent
Takesue et al.

(10) Patent No.: US 11,636,297 B2
(45) Date of Patent: Apr. 25, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Naoya Takesue, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/211,934

(22) Filed: Mar. 25, 2021

(65) Prior Publication Data

US 2021/0303952 A1  Sep. 30, 2021

(30) Foreign Application Priority Data

Mar. 31, 2020 (JP) .............................. JP2020-063607

(51) Int. Cl.
| | |
|---|---|
| *G06K 15/00* | (2006.01) |
| *G06K 15/02* | (2006.01) |
| *B41J 2/045* | (2006.01) |
| *G06K 15/10* | (2006.01) |

(52) U.S. Cl.
CPC .......... *G06K 15/408* (2013.01); *B41J 2/0451* (2013.01); *B41J 2/04586* (2013.01); *G06K 15/027* (2013.01); *G06K 15/102* (2013.01); *G06K 15/407* (2013.01)

(58) Field of Classification Search
CPC .. G06K 15/408; G06K 15/027; G06K 15/102; G06K 15/407; B41J 2/0451

USPC ......................................... 358/1.4, 1.9, 1.15
See application file for complete search history.

(56) References Cited

U.S. PATENT DOCUMENTS

| | | |
|---|---|---|
| 9,201,839 B2 | 12/2015 | Hara et al. |
| 9,462,091 B2 | 10/2016 | Hara et al. |
| 9,485,388 B2 | 11/2016 | Kodama et al. |
| 9,734,439 B2 | 8/2017 | Hara et al. |
| 9,749,496 B2 | 8/2017 | Fujimoto et al. |
| 10,027,848 B2 | 7/2018 | Fuse |
| 10,043,118 B2 | 8/2018 | Sumi et al. |
| 10,057,459 B2 | 8/2018 | Yamamoto et al. |
| 10,063,743 B2 | 8/2018 | Fuse |
| 10,073,370 B2 | 9/2018 | Takikawa et al. |

(Continued)

FOREIGN PATENT DOCUMENTS

| | | |
|---|---|---|
| JP | 2012-071474 A | 4/2012 |
| JP | 2012-147126 A | 8/2012 |

*Primary Examiner* — Quang N Vo
(74) *Attorney, Agent, or Firm* — Carter, Deluca & Farrell LLP

(57) ABSTRACT

To enable highly accurate density unevenness correction while suppressing a reduction in productivity in printing accompanying correction value calculation for density unevenness correction. Based on an image obtained by scanning a chart including patches having uniform density for each tone value, a density characteristic of each nozzle is acquired. A non-ejectable nozzle that cannot eject ink normally is detected by analyzing a pattern for detecting the non-ejectable nozzle in the image obtained by scanning the chart. At the time of acquiring the density characteristic, the density characteristic is acquired based on a density measured value of an area of the image, which corresponds to a nozzle that is not detected as the non-ejectable nozzle.

19 Claims, 18 Drawing Sheets

(56) References Cited

U.S. PATENT DOCUMENTS

| | | | |
|---|---|---|---|
| 10,187,553 B2 | 1/2019 | Takesue et al. | |
| 10,194,053 B2 | 1/2019 | Otani et al. | |
| 10,205,854 B2 | 2/2019 | Shimada et al. | |
| 10,356,282 B2 | 7/2019 | Ochiai et al. | |
| 10,545,446 B2 | 1/2020 | Takikawa et al. | |
| 10,733,488 B2 | 8/2020 | Takesue et al. | |
| 10,831,121 B2 | 11/2020 | Yanai et al. | |
| 10,834,288 B2 | 11/2020 | Hashioka et al. | |
| 10,855,877 B2 | 12/2020 | Takesue et al. | |
| 10,896,358 B2 | 1/2021 | Kikuta et al. | |
| 2012/0154837 A1* | 6/2012 | Yamazaki | H04N 1/4015 358/1.9 |
| 2016/0059599 A1* | 3/2016 | Kyoso | B41J 2/04558 347/19 |
| 2017/0282535 A1* | 10/2017 | Shibata | B41J 2/2139 |
| 2020/0079102 A1 | 3/2020 | Ochiai et al. | |
| 2020/0156386 A1 | 5/2020 | Otani et al. | |
| 2020/0184289 A1 | 6/2020 | Takesue et al. | |
| 2020/0198365 A1 | 6/2020 | Ochiai et al. | |
| 2020/0247137 A1 | 8/2020 | Otani et al. | |
| 2020/0349405 A1 | 11/2020 | Otani et al. | |
| 2021/0158112 A1 | 5/2021 | Otani et al. | |

* cited by examiner

|  | \multicolumn{6}{c}{NOZZLE POSITION NUMBER} |
|---|---|---|---|---|---|---|
|  | 0 | 1 | ··· | n-1 | n | n+1 | ··· |
| 0 | 0 | 0 | ··· | 0 | 0 | 0 | ··· |
| 32 | 31 | 34 | ··· | 30 | 32 | 33 | ··· |
| 64 | 63 | 70 | ··· | 62 | 64 | 65 | ··· |
| · | · | · |  | · | · | · |  |
| · | · | · | ··· | · | · | · | ··· |
| · | · | · |  | · | · | · |  |
| 255 | 255 | 255 | ··· | 255 | 255 | 255 | ··· |

(TONE VALUE on vertical axis)

FIG.11A

|  | \multicolumn{6}{c}{NOZZLE POSITION NUMBER} |
|---|---|---|---|---|---|---|
|  | 0 | 1 | ··· | n-1 | n | n+1 | ··· |
| 0 | 0 | 0 | ··· | 0 | 0 | 0 | ··· |
| 32 | 31 | 34 | ··· | 46 | 0 | 55 | ··· |
| 64 | 63 | 70 | ··· | 94 | 0 | 97 | ··· |
| · | · | · |  | · | · | · |  |
| · | · | · | ··· | · | · | · | ··· |
| · | · | · |  | · | · | · |  |
| 255 | 255 | 255 | ··· | 255 | 0 | 255 | ··· |

(TONE VALUE on vertical axis)

FIG.11B

| NOZZLE POSITION NUMBER | Cn=1 | Cn=2 | Cn=3 |
|---|---|---|---|
| 0 | ○ | ○ | ○ |
| 1 | ○ | ○ | ○ |
| 2 | × | × | ○ |
| 3 | ○ | ○ | ○ |
| 4 | ○ | ○ | × |
| 5 | ○ | ○ | ○ |
| ⋮ | ⋮ | ⋮ | ⋮ |

FIG.15

IMAGE PROCESSING APPARATUS, IMAGE PROCESSING METHOD, AND STORAGE MEDIUM

BACKGROUND OF THE INVENTION

Field of the Invention

The present disclosure relates to an image processing technique for reducing density unevenness and streaks that occur at the time of forming an image by ejecting ink.

Description of the Related Art

Conventionally, an ink jet printing apparatus is used that forms a desired image on a printing medium by ejecting ink droplets from each nozzle while relatively moving a print head having a nozzle column in which a plurality of ink ejection ports (nozzles) is arrayed and the printing medium. There is a case where the print head that is used in the ink jet printing apparatus has a variation in the ejection amount among a plurality of nozzles due to manufacturing errors and the like. In a case where the variation in the ejection amount such as this exists, it may happen sometimes that density unevenness occurs in an image that is formed.

Conventionally, as processing to reduce the density unevenness such as this, the HS (Head Shading) technique is known. In the HS technique, the density unevenness that occurs in a formed image is reduced by increasing or reducing the number or the size of ink dots that are finally formed in accordance with information (nozzle characteristic) relating to the ejection amount of each nozzle. At the time of acquiring the above-described nozzle characteristic, for example, a method is used generally in which a chart including patches having uniform density for each tone is printed on a paper surface and the printing results are read by a scanner and the read image is analyzed.

On the other hand, there is a case where a non-ejectable nozzle that cannot eject ink droplets occurs among a plurality of nozzles within the print head. As a technique to suppress white streaks on an image, which result from the non-ejectable nozzle such as this, non-ejection complementation processing is known. In the non-ejection complementation processing, white streaks are suppressed by forming ink droplets that should be formed by the non-ejectable nozzle by another nozzle in a complementary manner. Japanese Patent Laid-Open No. 2012-71474 has described a technique to complement ink droplets in the charge of the non-ejectable nozzle by peripheral nozzles thereof based on the acquired nozzle characteristic.

The density unevenness correction processing and the non-ejection complementation processing, both described above, are processing independent of each other, but it is known that as a result of both pieces of processing being performed in the area corresponding to the non-ejectable nozzle and the peripheral nozzles thereof in an overlapping manner, the correction in the area becomes excessive and black streaks and density unevenness occur. In this regard, Japanese Patent Laid-Open No. 2012-147126 has described a technique to suppress black streaks and density unevenness by modifying the read data of the density distribution measurement chart based on the information on the non-ejectable nozzle and calculating the correction value for the density unevenness correction based on the modified read data.

There is a case where a non-ejectable nozzle recovers and becomes a normal nozzle by performing cleaning processing of the print head in the maintenance mode or the like. On the other hand, there is a case where a non-ejectable nozzle occurs suddenly during execution of printing processing. Because of this, in a case where an attempt is made to maintain favorable printing results by the method of Japanese Patent Laid-Open No. 2012-147126 described above, it is necessary to frequently perform correction value calculation for the density unevenness correction that takes the non-ejectable nozzle into consideration. However, the above-described correction value calculation requires much time and effort, and therefore, in a case where this is performed frequently, productivity of printing is reduced.

Consequently, an object of the technique of the present disclosure is to enable highly accurate density unevenness correction while suppressing a reduction in productivity of printing accompanying correction value calculation for density unevenness correction.

SUMMARY OF THE INVENTION

The image processing apparatus according to the present disclosure is an image processing apparatus for an image forming apparatus that prints an image on a printing medium by using a print head including a plurality of nozzles ejecting ink, and the image processing apparatus includes: an acquisition unit configured to acquire a density characteristic of each nozzle based on an image obtained by scanning a chart including patches having uniform density for each tone; and a detection unit configured to detect a non-ejectable nozzle that cannot eject ink normally by analyzing a pattern for detecting the non-ejectable nozzle in the image obtained by scanning the chart, and the acquisition unit acquires the density characteristic based on a density measured value of an area of the image, which corresponds to a nozzle that is not detected as the non-ejectable nozzle by the detection unit.

Further features of the present invention will become apparent from the following description of exemplary embodiments with reference to the attached drawings.

BRIEF DESCRIPTION OF THE DRAWINGS

FIG. 11A and FIG. 11B are diagrams explaining a change of a correction table;

FIG. 15 is a diagram showing an example of a non-ejectable nozzle checklist;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, a correction table not including the influence of a non-ejectable nozzle is obtained by using a predetermined chart to which a pattern capable of detecting a non-ejectable nozzle is attached and repeating cleaning processing of a print head and outputting of the predetermined chart until a non-ejectable nozzle is no longer detected. Then, the occurrence of white streak due to a non-ejectable nozzle is suppressed by performing non-ejectable nozzle detection processing at predetermined timing in a case of performing printing processing and appropriately modifying the correction table in a case where a non-ejectable nozzle is detected.

<Hardware Configuration of Image Forming System>

Figure 1:
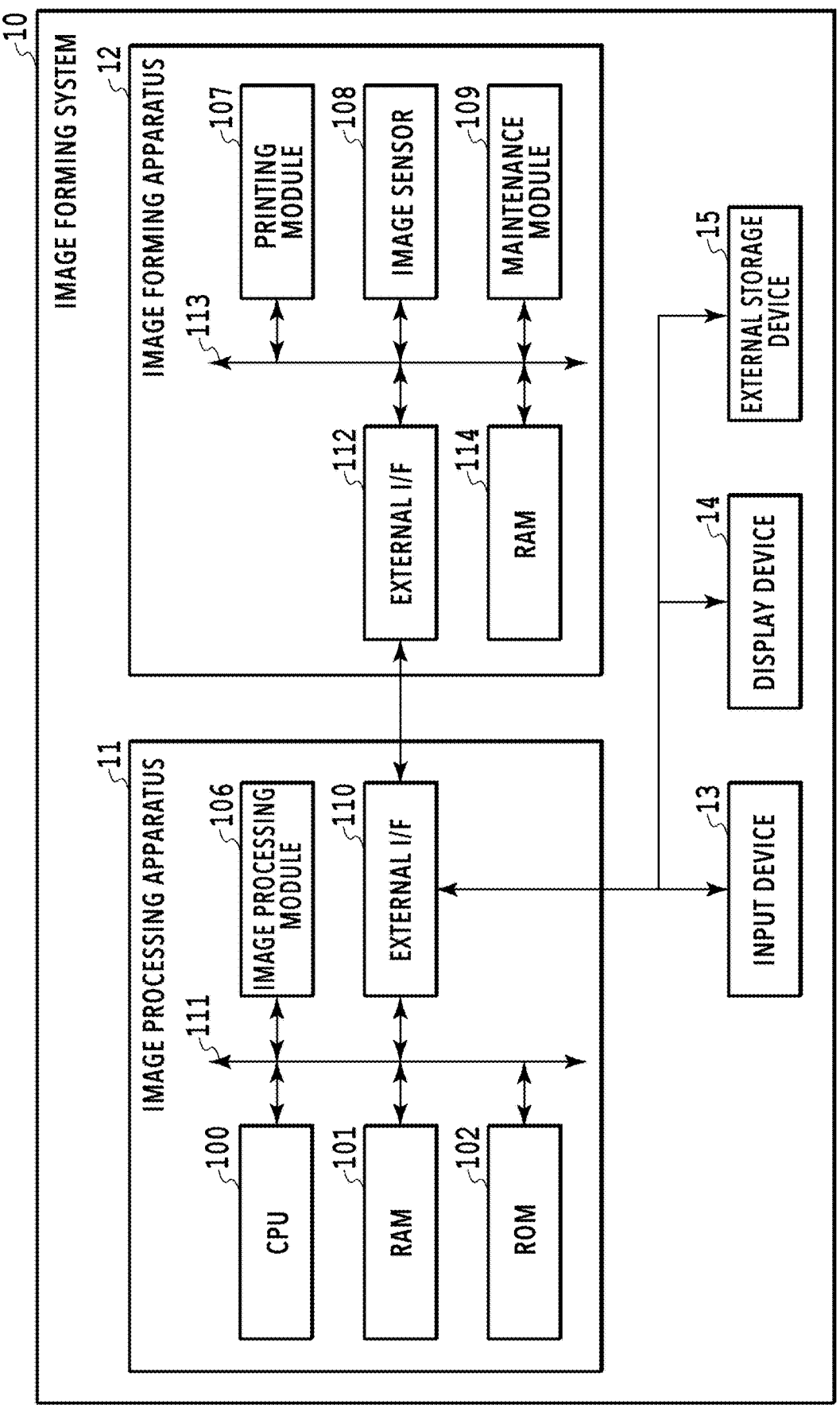
FIG. 1 is a diagram showing a hardware configuration of an image forming system.

FIG. 1 is a diagram showing the hardware configuration of an image forming system 10 according to the present embodiment. The image forming system 10 in the present embodiment has an image processing apparatus 11, an image forming apparatus 12, an input device 13, a display device 14, and an external storage device 15. In the following, components of the image forming system 10 are explained.

The image processing apparatus 11 comprises a CPU 100, a RAM 101, a ROM 102, an image processing module 106, an external I/F (interface) 110, and a bus 111 and functions as a so-called image processing controller. Further, the image processing apparatus 11 is connected to the input device 13, the display device 14, and the external storage device 15 via the external I/F 110.

The CPU (Central Processing Unit) 100 controls the operation of the entire image forming system 10 by using input data and computer programs stored in the RAM 101 and the ROM 102. Here, a case is explained as an example where the CPU 100 controls the entire image forming system 10, but it may also be possible to control the entire image forming system 10 by a plurality of pieces of hardware sharing the processing.

The RAM (Random Access Memory) 101 temporarily stores computer programs and data read from the external storage device 15 and data received from the outside via the external I/F 110. Further, the RAM 101 is used as a storage area that is used in a case where the CPU 100 performs various kinds of processing and a storage area that is used in a case where the image processing module 106 performs image processing. The ROM (Read Only Memory) 102 stores setting parameters, boot programs and the like of each unit within the image processing apparatus 11.

The image processing module 106 is implemented by a processor capable of executing computer programs and a dedicated image processing circuit and performs various kinds of image processing for converting image data that is input as a printing target into image data that can be output by the image forming apparatus 12. The configuration may be one in which the CPU 100 performs various kinds of image processing as the image processing module 106 in place of preparing a dedicated processor as the image processing module 106.

The external I/F 110 is an interface for connecting the image processing apparatus 11 and the image forming apparatus 12, the input device 13, the display device 14, and the external storage device 15. Further, the external I/F 110 also functions as a communication interface for performing transmission and reception of data with an external device, not shown schematically, by using infrared communication, a wireless LAN, the internet or the like.

The input device 13 is, for example, a keyboard, a mouse and the like and receives an operation (instructions) by an operator. It is possible for an operator to input various instructions to the CPU 100 via the input device 13. The display device 14 is, for example, a CRT, a liquid crystal display and the like, and displays processing results by the CPU 100 by images, characters and the like. In a case where the display device 14 is a touch panel capable of detecting a touch operation, it may also be possible for the display device 14 to function as part of the input device 13.

The external storage device 15 is, for example, a large-capacity information storage device, such as an HDD and an SSD. In the external storage device 15, the OS, computer programs for causing the CPU 100 to perform various kinds of processing, data and the like are stored. Further, the external storage device 15 also stores various tables and the like, in addition to storing image data that is input and output and temporary data that is generated by the processing of each unit. For example, a color conversion table that is used in the image processing module 106, a threshold value matrix, information relating to the ink injection of each nozzle, image data of each chart for density characteristic acquisition and non-ejectable nozzle detection, and the like are stored. Computer programs and various kinds of data stored in the external storage device 15 are read appropriately in accordance with the control by the CPU 100 and stored in the RAM 101 and become a target of the processing by the CPU 100.

The image forming apparatus 12 comprises a printing module 107, an image sensor 108, a maintenance module 109, an external I/F 112, a bus 113, and a RAM 114.

Figure 2:
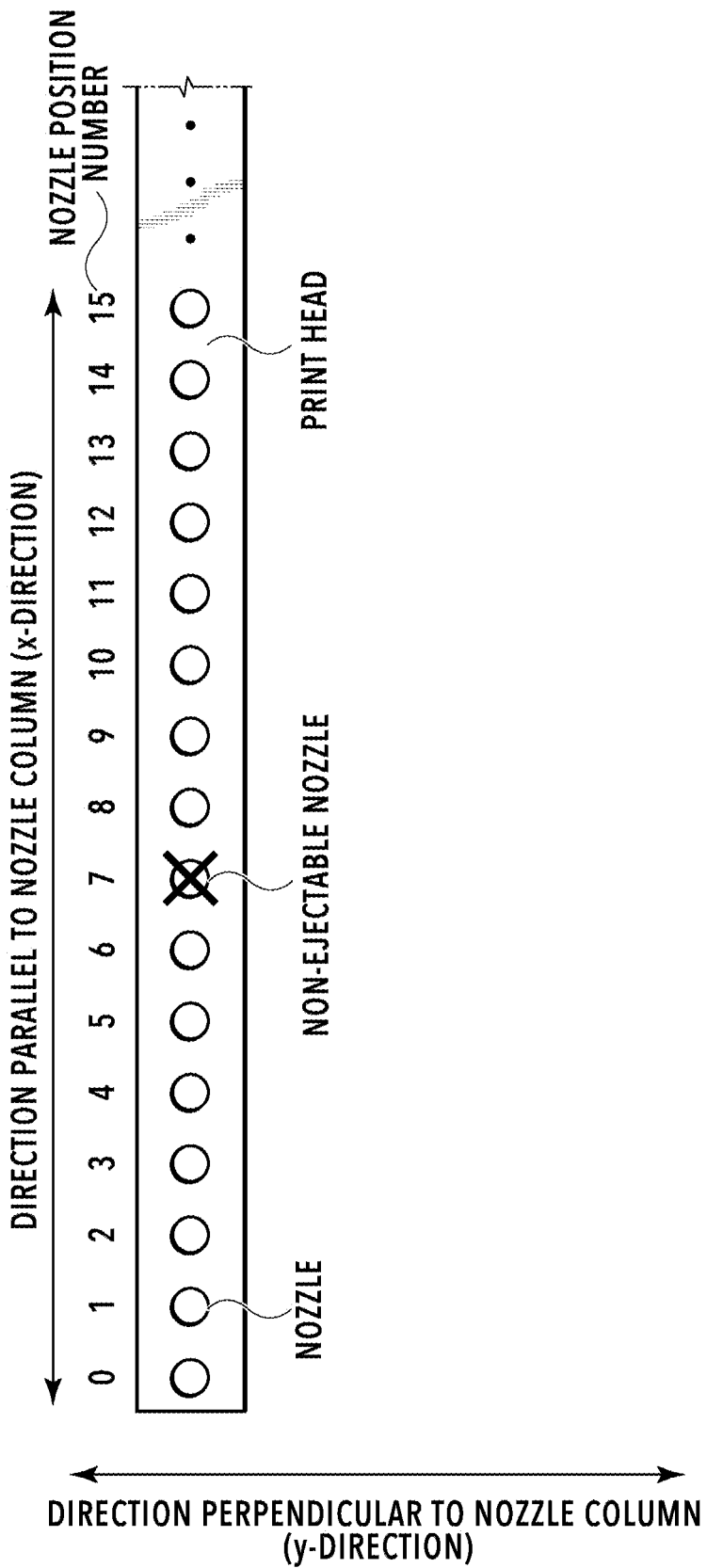
FIG. 2 is a diagram showing a configuration example of a print head.

The external I/F 112 is an interface for connecting the image forming apparatus 12 to the image processing apparatus 11. The RAM 114 is used for storage of data and the like being processed and temporarily stores, for example, image data (halftone image data) for print output, which is acquired from the image processing apparatus 11. The printing module 107 forms an image on a printing medium by the ink jet method based on the halftone image data stored in the RAM 114. The halftone image data is acquired directly from the image processing module 106 of the image processing apparatus 11 or by reading it from the external storage device 15. The print head comprised by the printing module 107 has nozzle columns (printing element columns) corresponding to the number of ink colors, in which a plurality of ink ejectable nozzles (printing elements) is arrayed in one direction. FIG. 2 is a diagram showing a configuration example of the print head. In a case of an image forming system compatible with color printing, typically, the print head mounts four nozzle columns corresponding to each ink of cyan (C), magenta (M), yellow (Y), and black (K). In FIG. 2, for simplification of explanation, only the nozzle column of black (K) is shown schematically. The print head shown in FIG. 2 is a long line head that covers the entire width of a drawing area in the direction (x-direction) parallel to the nozzle column. The print head forms an image on a printing medium by generating dots by ejecting ink droplets while relatively moving the printing medium in the direction (y-direction) perpendicular to the nozzle column, which is perpendicular to the direction parallel to the nozzle column, based on a drive signal. In FIG. 2, that the nozzle whose nozzle position number is 7 has become a non-ejectable nozzle is indicated by a x mark. In the present specification, it is assumed that the term "non-ejectable nozzle" generally means a nozzle in the state of not being capable of ejecting ink normally and includes a nozzle not capable of ejecting an appropriate amount of ink to an appropriate position, in addition to a nozzle in the state of not being capable of ejecting ink at all because of clogging or the like.

The image sensor 108 is a sensor for capturing an image formed on a printing medium by the printing module 107 and the image sensor 108 is, for example, a line sensor and an area sensor. The image sensor 108 functions as a unit configured to detect a non-ejectable nozzle from a captured image and a unit configured to acquire the ink ejection characteristic of each nozzle. It is not necessary for the image sensor 108 to be provided within the image forming apparatus 12 and for example, the image sensor 108 may be an in-line scanner or an offline scanner, not shown schematically, which is connected via the external I/F 110 of the image processing apparatus 11.

The maintenance module 109 performs cleaning processing for recovering the print head comprised by the printing module 107 by removing nozzle clogging. At the method of cleaning processing, for example, there is a method of moving the print head up to a position at which an absorbent material (sponge or the like) of wasted ink is located and forcing the ink head to eject a predetermined amount of ink from each nozzle within the nozzle column. Further, there is a method of pushing out ink forcibly by applying a pressure from the side of an ink tank. Alternatively, there is a method of removing clogging by forcibly sucking ink by applying a negative pressure from the outside of the nozzle. It is assumed that the image forming apparatus 12 of the present embodiment comprises an automatic cleaning mechanism by one of the above-described methods.

<Function Configuration of Image Processing Module 106>

Figure 3:
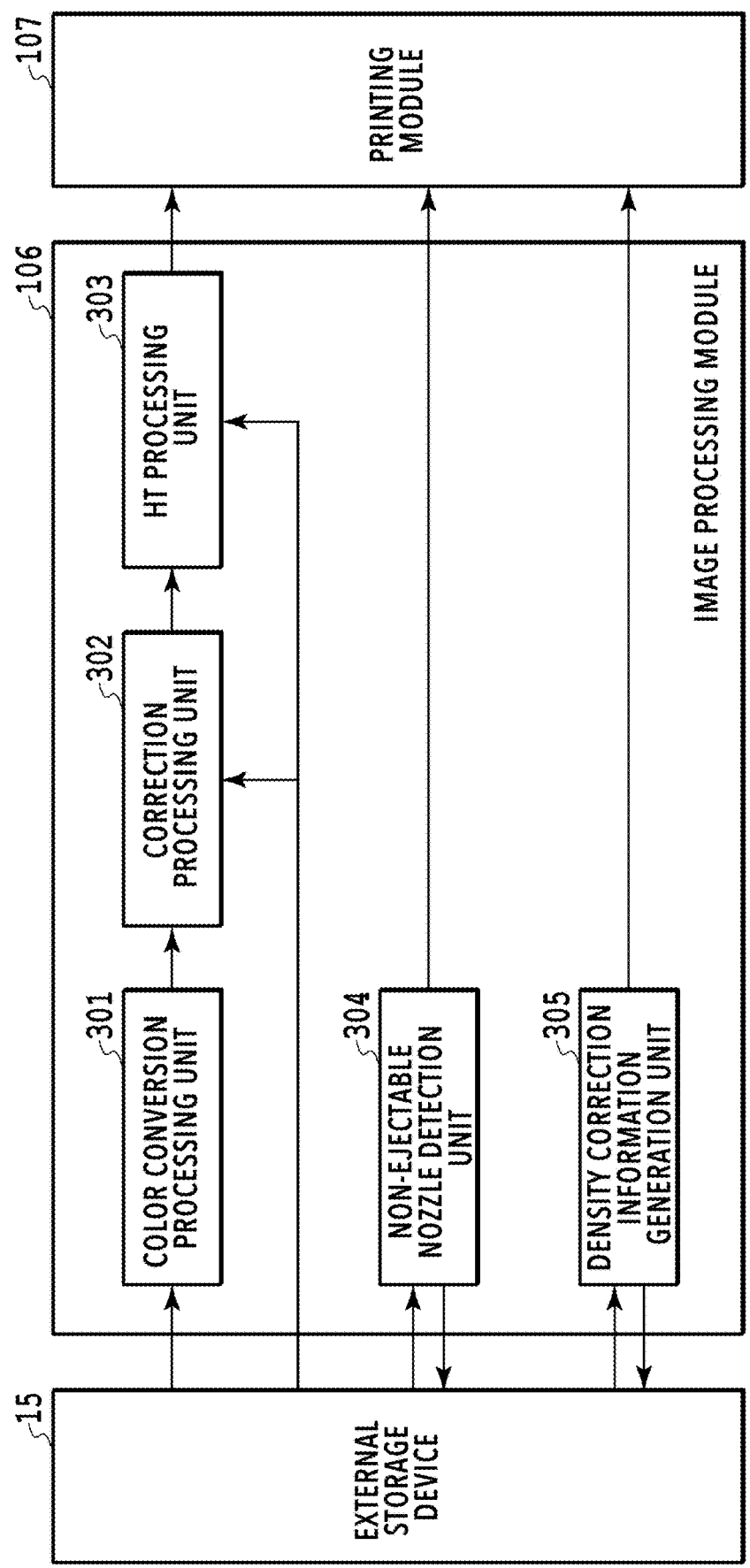
FIG. 3 is a diagram showing a function configuration of an image processing module.

Next, by using FIG. 3, the function configuration of the image processing module 106 is explained. The image processing module 106 includes a color conversion processing unit 301, a correction processing unit 302, an HT processing unit 303, a non-ejectable nozzle detection unit 304, and a density correction information generation unit 305. The resolution of the image data that is handled in the image processing module 106 is the same as the resolution of the nozzle arrangement of the print head and for example, 1,200 dpi. In the following, each unit is explained.

The color conversion processing unit 301 converts the input image data from the external storage device 15 into image data corresponding to the color reproduction area of the printing module 107. In the present embodiment, the input image data is 8-bit image data indicating color coordinates (R, G, B) in the color space coordinates, such as sRGB that are the representation colors of a monitor. The color conversion processing unit 301 converts the 8-bit input image data of each of RGB into 8-bit image data of each of R' G' B' corresponding to the color reproduction area of a printer. For the conversion, it is possible to use a publicly known method, such as matrix calculation processing and processing using a three-dimensional lookup table. Further, the color conversion processing unit 301 performs conversion processing to convert the 8-bit image data of each of R' G' B' after the conversion into color signals corresponding to a plurality of inks used in the printer. In a case where the printing module 107 uses, for example, the inks of black (K), cyan (C), magenta (M), and yellow (Y), conversion is performed into 8-bit image data of each of CMYK. This color conversion is also performed by using a three-dimensional lookup table together with interpolation calculation as in the above-described conversion from RGB into R'G'B'. As another conversion method, it is also possible to use a method, such as matrix calculation processing, as in the above.

The correction processing unit 302 performs correction processing for reducing both the density unevenness due to the difference in the nozzle characteristic and the white streak due to a non-ejectable nozzle for the image data of each color plane of CMYK after the color conversion processing based on the density correction information on each nozzle. Details of the correction processing will be described later.

The HT processing unit 303 performs conversion into the number tones that the printing module 107 can represent and halftone processing for determining the dot arrangement for the image data after the correction processing or multi-tone image data stored in the external storage device 15. The HT processing unit 303 of the present embodiment converts image data in which one pixel is represented by eight bits into 1-bit binary halftone image data (output image data) in which each pixel has a value of "0" or "1". In the halftone image data, the pixel whose pixel value (output value) is "0" indicates off of a dot and the pixel whose pixel value (output value) is "1" indicates on of a dot. To the halftone processing, it is possible to apply a publicly known method, such as the error diffusion method and the dither method. The halftone image data generated by the halftone processing is sequentially delivered directly to the printing module 107 within the image forming apparatus 12 or via the RAM 101 or the external storage device 15.

The non-ejectable nozzle detection unit 304 specifies a non-ejectable nozzle (its nozzle position number) in which an ink ejection failure has occurred in each nozzle column based on printing results of a non-ejectable nozzle detection chart that is output from the printing module 107. The non-ejectable nozzle detection chart is printed and output for each ink color (that is, for each nozzle column). For example, in a case where the printing module 107 uses four kinds of ink of CMYK, the non-ejectable nozzle detection chart is output for each ink and a non-ejectable nozzle is specified for each color of CMYK (for each nozzle column). Details of the processing to detect a non-ejectable nozzle will be described later. The processing contents are common to each ink color, and therefore, in the following, explanation is given by taking the nozzle column of the K ink as an example.

The density correction information generation unit 305 generates density correction information that specifies, for each nozzle configuring the nozzle column, an output tone value (density correction value) for an input tone value, with which the density unevenness is reduced in the printing results based on the scanned image obtained by reading the density characteristic acquisition chart. Here, in the density characteristic acquisition chart, at least a patch having uniform density that is for acquiring the characteristic of each nozzle and in which the density is varied stepwise is included. This density characteristic acquisition chart is also printed and output for each ink color. For example, in a case where the printing module 107 uses the four kinds of ink of CMYK, the dedicated chart is output for each ink color and the correction value is derived for each nozzle in the nozzle column of each of CMYK and the density correction information is generated. Details of the density correction information generation processing will be described later. The processing contents of the density correction information generation processing are common to each ink color (each nozzle column) like the non-ejectable nozzle detection processing, and therefore, in the following, explanation is given by taking the nozzle column of the K ink as an example.

<Non-Ejectable Nozzle Detection Processing>

Figure 4:
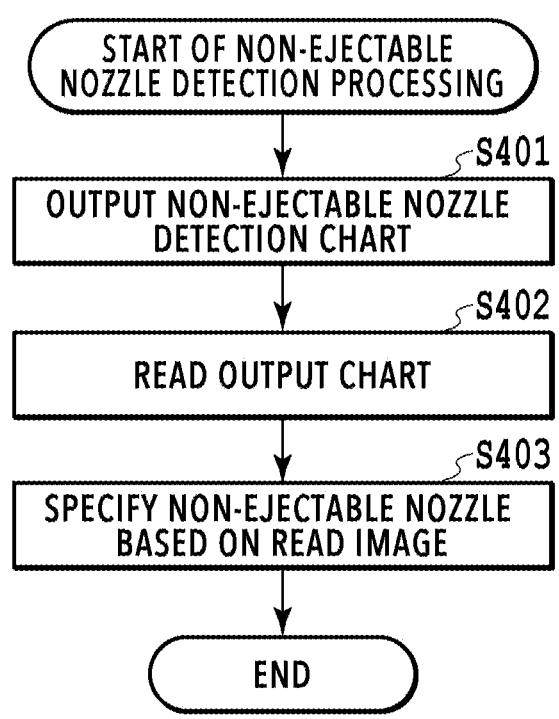
FIG. 4 is a flowchart showing a flow of non-ejectable nozzle detection processing.

Following the above, details of the processing to detect a non-ejectable nozzle in each nozzle column, which is performed by the non-ejectable nozzle detection unit 304, are explained with reference to the flowchart in FIG. 4.

Figure 5:
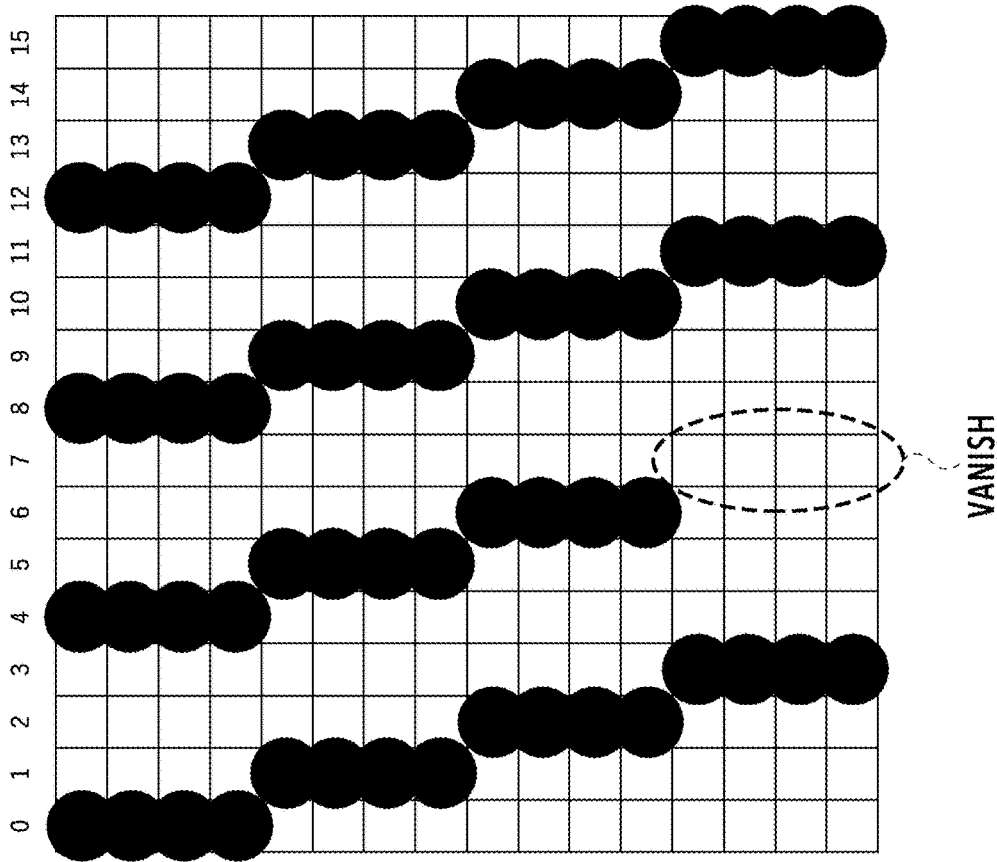
FIG. 5A and FIG. 5B are each a diagram showing an example of a non-ejectable nozzle detection chart.

First, at S401, data of a non-ejectable nozzle detection chart image for which halftone processing has been performed is acquired from the external storage device 15 and transmitted to the printing module 107 along with printing instructions thereof. The printing module 107 having received the printing instructions forms the chart image on a sheet and outputs the sheet. FIG. 5A shows an example of the non-ejectable nozzle detection chart image. The chart image in FIG. 5A has a configuration of 16 vertical pixels× 16 horizontal pixels and the numerical value ("0" or "255") of each pixel indicates the tone value. Further, the figures from 0 to 15 attached at the top of the chart image each indicate the nozzle position number corresponding to each pixel column and it is assumed that the correspondence between this nozzle position number and the nozzle position number in each nozzle column comprised by the print head shown in FIG. 2 is maintained. In the non-ejectable nozzle detection chart, a rectangle (including four pixels in the example in FIG. 5A) in the shape of a line is arranged so that it is possible to determine whether or not ink is ejected for each nozzle.

Next, at S402, the non-ejectable nozzle detection chart that is output from the printing module 107 is read by the image sensor 108.

Then, at S403, based on the read image (scanned image) of the non-ejectable nozzle detection chart obtained at S402, the position of a non-ejectable nozzle is specified. FIG. 5B is a diagram schematically showing a scanned image in a case where the nozzle whose nozzle position number is 7 is detected as a non-ejectable nozzle. As shown in FIG. 5B, in a case where a non-ejectable nozzle exists, the line that should originally be formed at the nozzle position is not formed. By causing the line that is not formed to correspond to the nozzle position number in this manner, it is possible to specify the position of the non-ejectable nozzle in each nozzle column.

The above is the contents of the non-ejectable nozzle detection processing.

<Density Correction Information Generation Processing>

Figure 6:
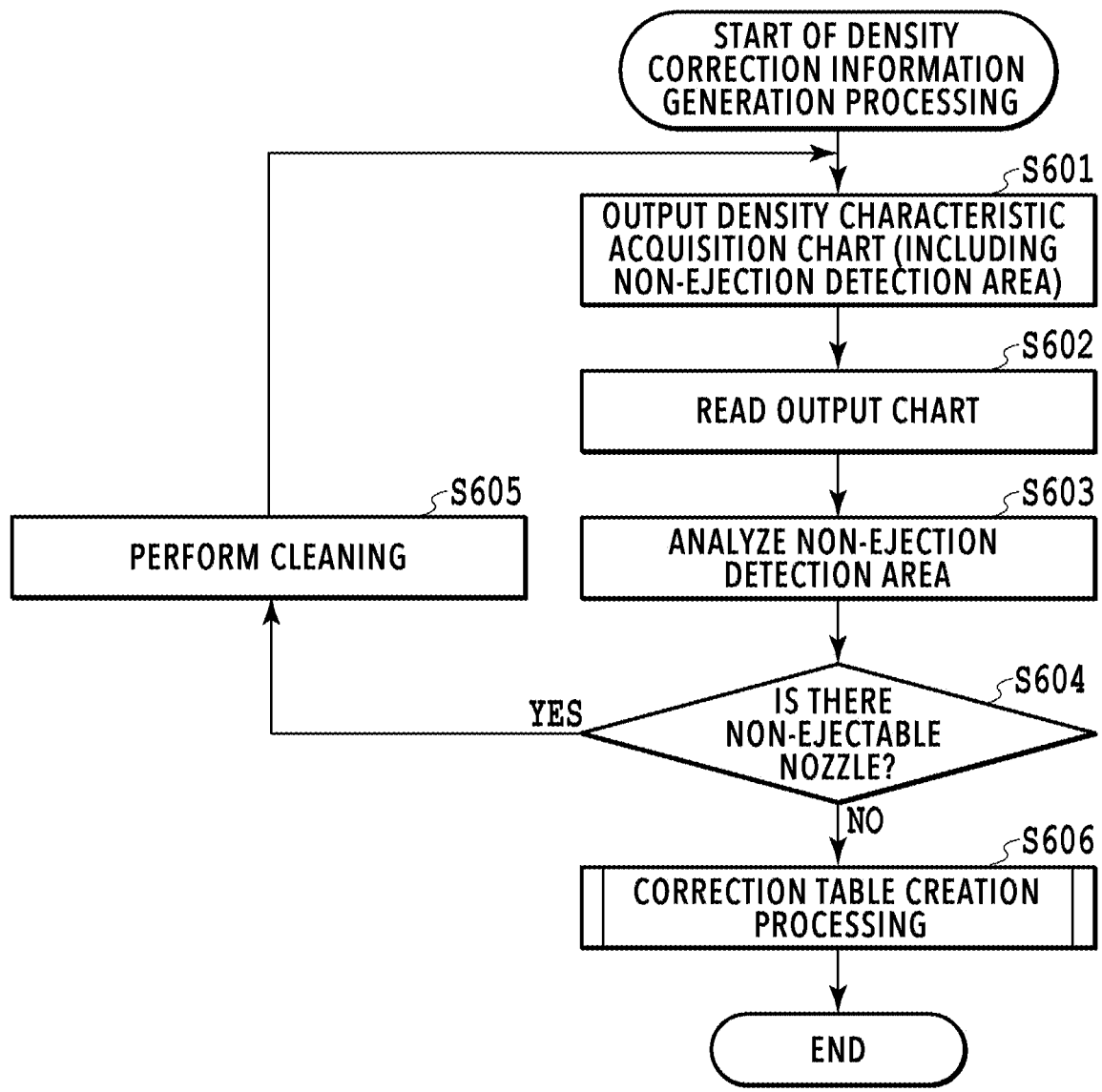
FIG. 6 is a flowchart showing a flow of density correction information generation processing according to a first embodiment.

Next, details of the processing to generate a correction table used in the correction processing for suppressing density unevenness, which is performed by the density correction information generation unit 305, are explained with reference to the flowchart in FIG. 6. Here, explanation is given by taking a case as an example where as density correction information, a correction table in an LUT (lookup table) format is generated, in which a plurality of input tone values that vary stepwise and correction values (output tone values) are associated with each other. However, the LUT format is an example and this is not limited and density correction information may be accepted in which the correction value for a certain input tone value is determined by using a mathematical formula or a function.

Figure 7:
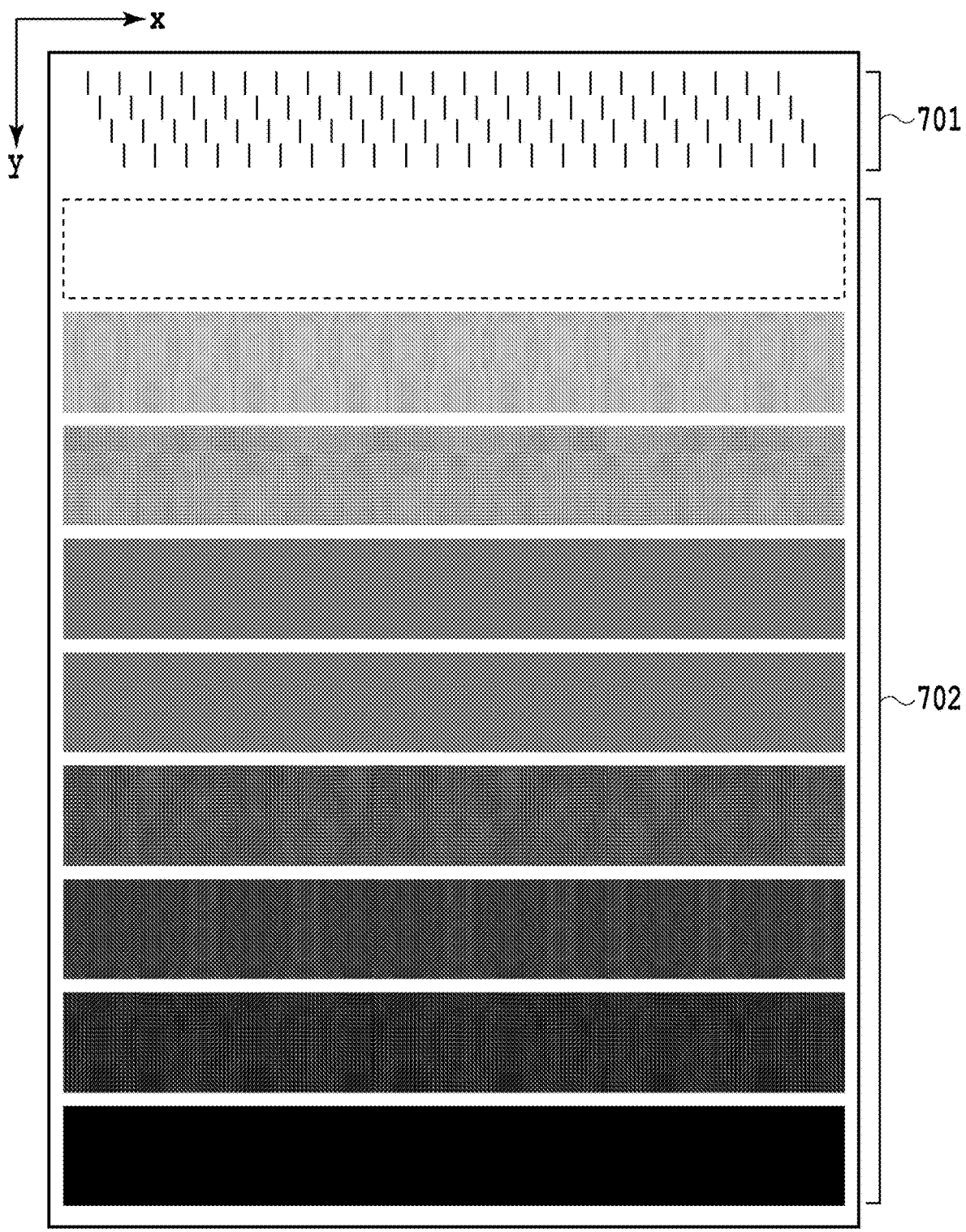
FIG. 7 is a diagram showing an example of a density characteristic acquisition chart.

First, at S601, data of a density characteristic acquisition chart image for which halftone processing has been performed is acquired from the external storage device 15 and transmitted to the printing module 107 along with printing instructions thereof. The printing module 107 having received the printing instructions forms the density characteristic acquisition chart image on a sheet and outputs the sheet. FIG. 7 shows an example of the density characteristic acquisition chart according to the present embodiment. The density characteristic acquisition chart image in the present embodiment includes two kinds of image area, that is, a non-ejection detection area 701 and a density patch area 702. The non-ejection detection area 701 is an image area for detecting the nozzle position number in a case where there is a non-ejectable nozzle and for example, may be the same chart as the non-ejectable nozzle detection chart described previously. The density patch area 702 is an image area for acquiring the density characteristic of each nozzle in each nozzle column configuring the print head. In the density patch area 702 shown in FIG. 7, nine kinds of rectangular patch having uniform density in which the density is varied at nine levels are formed.

Next, at S602, the density characteristic acquisition chart that is output from the printing module 107 is read by the image sensor 108. The color space of the read image (scanned image) of the density characteristic acquisition chart is arbitrary, but here, it is assumed that the read image is an image of three channels of RGB. Then, it is assumed that the scanned image of the three channels of RGB is converted into a scanned image of one channel by a color conversion table prepared in advance in accordance with the reading characteristic of the image sensor 108. Here, the color conversion table is a table that converts the pixel value of the image into a value linear to density, for example, such as the Y value in the CIEXYZ color space and the L* value in the CIEL*a*b* color space. Further, in a case where each patch on the printed and output chart is formed by a color ink, such as cyan, magenta, and yellow, it may also be possible to use a value corresponding to saturation in place of a value corresponding to brightness. For example, it may also be possible to use RGB values as values corresponding to the complementary colors of cyan, magenta, and yellow, respectively. In the present embodiment, it is assumed that the scan resolution is 1,200 dpi the same as the resolution of the nozzle arrangement of the print head.

Next, at S603, the non-ejection detection area 701 on the read image (scanned image) obtained at S602 is analyzed and in a case where a non-ejectable nozzle is detected, the nozzle position thereof is specified. In a case where a non-ejectable nozzle is detected, the nozzle position number of the nozzle is stored in the external storage device 15 as non-ejectable nozzle information. In a case where the non-ejection detection area 701 is detected from the scanned image, it may be possible to apply a publicly known method, for example, such as a pattern matching method and a method that uses a position marker (not shown schematically).

At S604, based on the analysis results of the non-ejection detection area at S603, the next processing contents are determined. In a case where a non-ejectable nozzle is detected as a result of the analysis, the processing advances to S605 and in a case where no non-ejectable nozzle is detected, the processing advances to S606.

At S605, the maintenance module 109 is instructed to perform cleaning processing for recovering the print head. Then, in the maintenance module 109 having received the instructions, the cleaning processing is performed. At the same time as that, the scanned image data of the dedicated chart that is read at S602 is discarded. In a case where the cleaning processing is completed, the processing returns to S601 and the processing at S601 to S604 is repeated again. That is, each time the density characteristic acquisition chart is output, an attempt is made to recover the non-ejectable nozzle by performing the cleaning processing. It may also be possible to design a configuration in which the number of times the cleaning processing at 605 is performed is counted and in a case where the count value exceeds a predetermined number of times, a user is notified of an error and the density correction information generation processing is not performed until, for example, the print head is exchanged with another.

Figure 8:
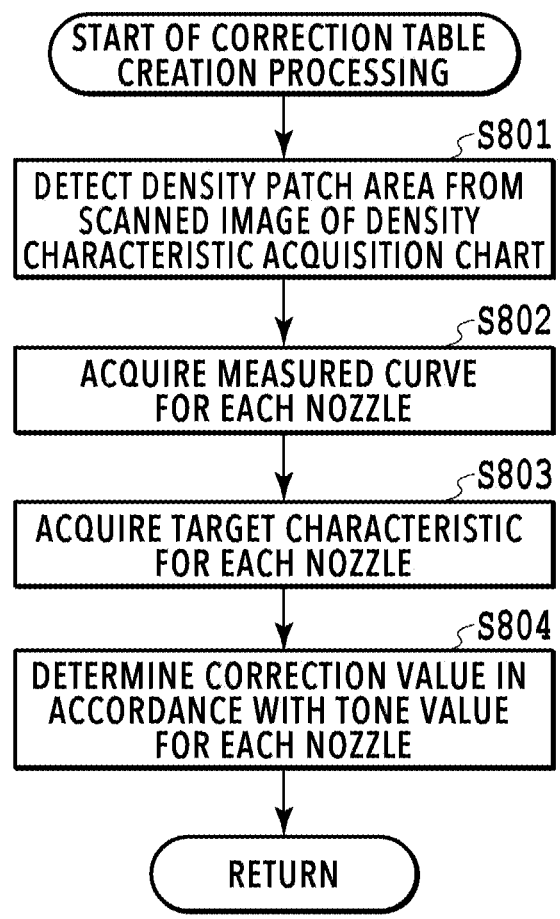
FIG. 8 is a flowchart showing a flow of correction table creation processing.

At S606, processing to create a correction table excluding the influence of a non-ejectable nozzle is performed by calculating the correction value corresponding to the input tone value for each nozzle based on the scanned image acquired at S602. FIG. 8 is the flowchart showing details of correction table creation processing. In the following, explanation is given along the flow in FIG. 8.

Figure 9A:
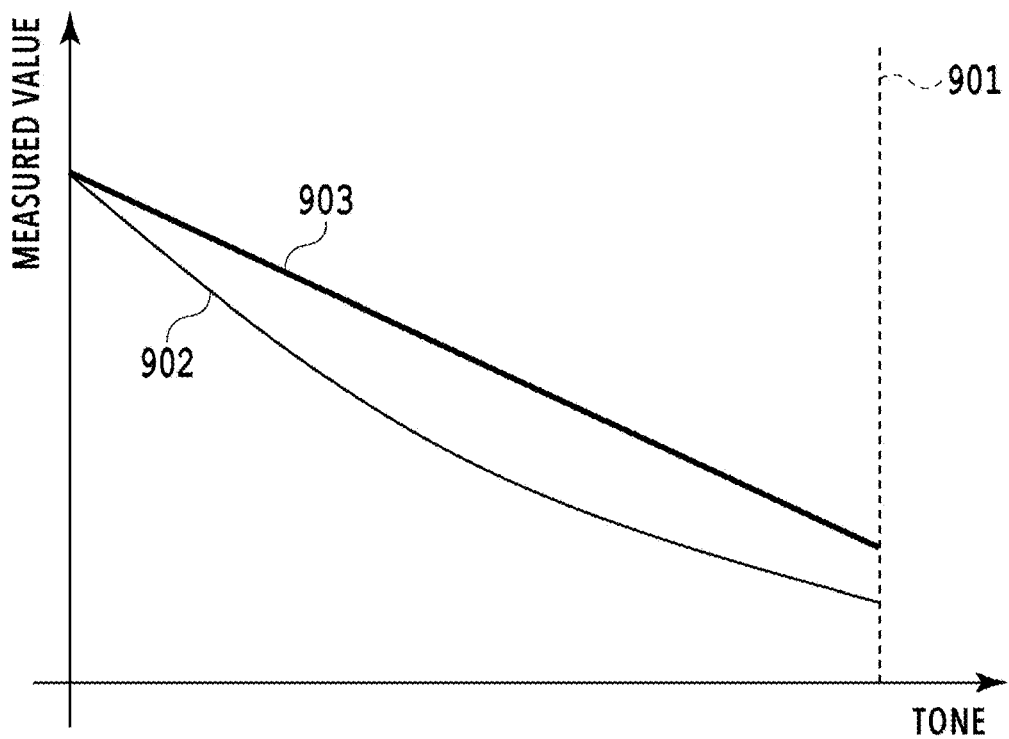
FIG. 9A and FIG. 9B are each a diagram explaining a derivation method of a correction value for an input tone value.

First, at S801, from the scanned image of the density characteristic acquisition chart acquired at S602, the density patch area 702 is detected. At S802 that follows, from the detected density patch area 702, a measured curve corresponding to each nozzle is acquired. Here, the measured curve is a curve indicating a correspondence relationship between the tone value corresponding to each nozzle and the measured signal value on the scanned image. FIG. 9A shows an example of the measured curve. In FIG. 9A, the horizontal axis represents the input signal value (input tone value) of the density patch area 702 and the vertical axis represents the signal value (to be strict, the value after three channels of RGB are converted into one channel indicating density. In the following, described as "measured value") that is measured from the scanned image. Further, in FIG. 9A, a broken line 901 indicates the upper limit value of the horizontal axis and in a case of an 8-bit input signal value, the upper limit value is "255". Then, a curve 902 in FIG. 9A indicates a measured curve obtained by the measured value corresponding to each tone value of the density patch area 702 and the results of interpolation calculation thereof. In the present embodiment, as the interpolation method, piecewise linear interpolation is used. However, the interpolation method may be any one and it may also be possible to use a publicly known spline curve. The measured curve 902 represents the density characteristic of the nozzle corresponding to a pixel position x and is obtained corresponding to the number of nozzles used at the time of forming the density characteristic acquisition chart image on the sheet. A different measured curve is obtained for each nozzle and for the nozzle whose ink ejection amount is small, the measured curve shifts in the upward direction (in the direction in which brightness becomes higher) and for the nozzle whose ink ejection amount is large, the measured curve shifts in the downward direction (in the direction in which brightness becomes lower). At next S803, a target characteristic corresponding to each nozzle is acquired. Here, the target characteristic is the target density characteristic determined in advance in accordance with the measured curve of each nozzle. A straight line 903 (a set of measured values that are linear to the tone) in FIG. 9A indicates the target characteristic.

Figure 9B:
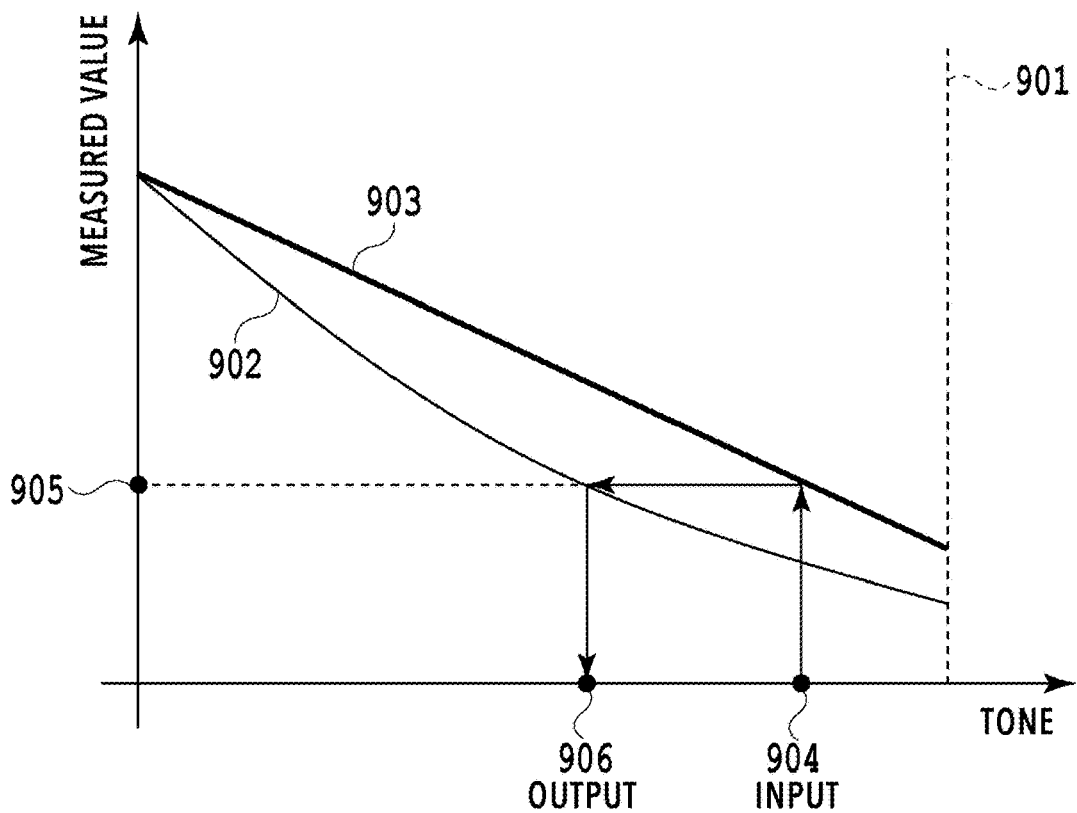

Then, at S804, based on the measured curve acquired at S802 and the target characteristic acquired at S803, the correction value in accordance with each tone value is determined for each nozzle. FIG. 9B is a diagram explaining how to find the correction value. First, the nozzle position number of the derivation-target nozzle of interest and the input tone value for which it is desired to find the correction value are acquired. In FIG. 9B, a point 904 on the horizontal axis indicates the input tone value. Next, the target density value corresponding to the input tone value 904 is found from the target characteristic 903. In FIG. 9B, a point 905 on the vertical axis indicates the target density value that is found from the input tone value 904 and the target characteristic 903. Then, from the measured curve 902 of the nozzle of interest, the tone value corresponding to the target density value 905 is found and determined as the correction value (output tone value) corresponding to the input tone value 904. In FIG. 9B, a point 906 on the horizontal axis indicates the correction value (output tone value) 906 corresponding to the input tone value 904. By performing the processing such as this for a plurality of tone values determined in advance, a correction table for the nozzle of interest is obtained in which the output tone value (correction value) is associated with a predetermined input tone value. In place of finding each individual correction value corresponding to all the input tone values from 0 to 255, it may also be possible to find only the correction values corresponding to representative tone values (for example, nine tone values corresponding to the density patches). In that case, at the time of performing the correction processing using the correction table, for the input tone value that is not specified within the table, it is sufficient to find the corresponding correction value by interpolation processing.

In a case where the above-described processing is completed for all the nozzles of each nozzle column, the created correction table is stored in the external storage device 15 and this processing is terminated.

The above is the contents of the density correction information generation processing. It is necessary to complete the creation of the correction table before the start of execution of the printing processing based on user instructions and the creation of the correction table is performed at the time of shipment of the system or at the time of attachment of the print head. Further, the creation or updating of the correction table is performed at predetermined timing designated by a user, such as the timing at which the print head is exchanged with another. Alternatively, it may also be possible to evaluate the correction table at arbitrary timing and update the correction table in a case where the correction value deviates from the appropriate correction value due to a change in the nozzle characteristic or the like.

<Flow of Printing Processing>

Figure 10:
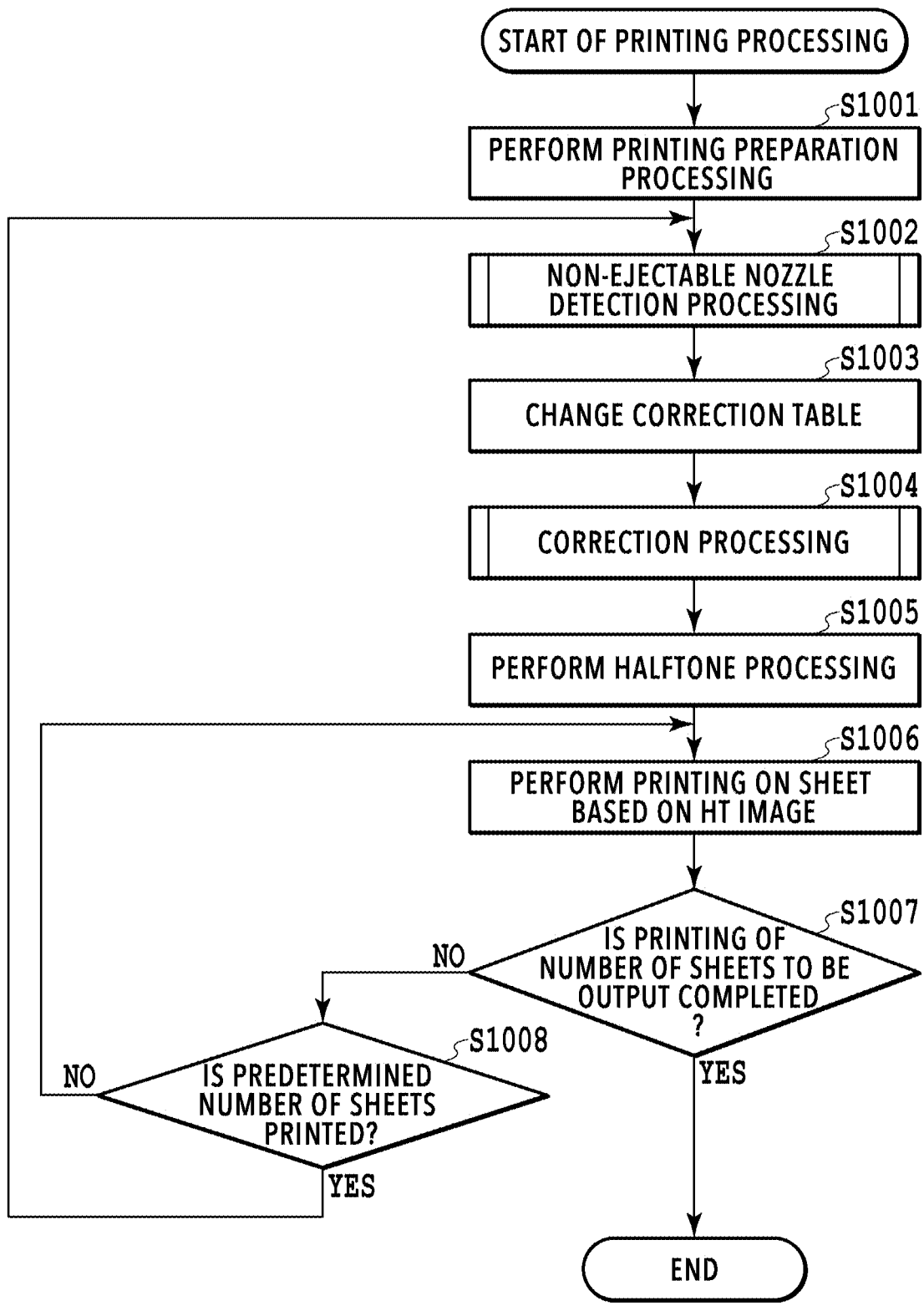
FIG. 10 is a flowchart showing a flow of printing processing in the image forming system.

Following the above, the flow of the printing processing in the image forming system 10 is explained along the flowchart shown in FIG. 10. In the process of this printing processing, the correction processing using the correction table created by the above-described method is performed. Before giving a detailed explanation along the flow in FIG. 10, the design concept of the printing processing according to the present embodiment is explained.

The white spot resulting from a non-ejectable nozzle is likely to be conspicuous perceptually compared to the density unevenness due to a difference in the nozzle characteristic. Because of this, in a case where the white spot occurs, it is preferable to detect it quickly and perform complementation. Further, in order to detect a non-ejectable nozzle, it is only required to determine whether or not ink is ejected, and therefore, the number of dedicated charts to be output is small and the processing time required for non-ejectable nozzle detection is short compared to those of the density correction information generation processing. On the other hand, the density unevenness results from the variation in the ejection characteristic (ejection amount/ejection direction/ejection speed) at the time of manufacturing of the print head, the inclination of the head at the time of attachment of the print head, the crosstalk at the time of the drive of the print head, and the like, and the density unevenness is unlikely to change over time. However, the characteristic of each nozzle is not linear to the input level, and therefore, the number of dedicated charts to be output increases and the processing time required for derivation of the correction value is prolonged compared to those of the non-ejectable nozzle detection. Because of this, it is desirable to reduce the execution frequency of the density correction information generation processing whose processing load is large as low as possible. On the other hand, as regards the non-ejectable nozzle detection processing whose processing load is small, it is preferable to maintain the printed image quality by increasing the execution frequency thereof. The printing processing designed based on the above-described basic concept is performed based on user instructions. The series of processing shown in the flow in FIG. 10 is started by a user designating the file name of printing-target image data and the number of sheets to be printed, and giving instructions to perform the processing via the input device 13.

First, at S1001, printing preparation processing is performed in the image processing apparatus 11. Specifically, first, printing-target image data is read from the external storage device 15 based on the file name designated by a user and sent to the image processing module 106, and color conversion processing is performed in the color conversion processing unit 301. Further, a number of sheets to be output N designated by a user is set to the RAM 101 or the like and further, a counter Cn_p that counts the number of printed and output sheets is initialized (count value=0). In a case where the printing preparation processing is completed, the processing advances to S1002.

At S1002, the non-ejectable nozzle detection processing described previously (see the flow in FIG. 4) is performed. The results of the non-ejectable nozzle detection processing are stored in the external storage device 15 as non-ejectable nozzle information.

At S1003 that follows, based on the non-ejectable nozzle information generated at S1002, the correction value corresponding to the non-ejectable nozzle in the correction table is changed. Specifically, among the correction values of each tone value specified in association with the nozzle position number in the correction table, the correction values corresponding to the found non-ejectable nozzle and the peripheral nozzles thereof are changed so that the white spot that occurs due to the non-ejectable nozzle becomes unlikely to be perceived. Here, a more detailed explanation is given by using a specific example. FIG. 11A shows the correction table before being changed, which has been obtained by the density correction information generation processing. In the correction table in FIG. 11A, correction values corresponding to nine tones×number of nozzles are stored. For example, in a case where the input tone value of a printing-target image is "32", the correction value (output tone value) corresponding to the nozzle position number 1 is "34". Here, it is assumed that the nozzle whose nozzle position number is n is detected as a non-ejectable nozzle in the non-ejectable nozzle detection processing at S1002 described above. FIG. 11B shows the correction table after being changed at this time. As shown in FIG. 11B, in the correction table after being changed, all the correction values of the nth nozzle, which is the non-ejectable nozzle, are changed to "0". Changing the correction values of a certain nozzle to "0" means performing control so that the nozzle does not eject ink. By changing the correction values in this manner, it is possible to suppress a black streak from occurring even in a case where the non-ejectable nozzle recovers unexpectedly during the printing processing. Further, in the example shown in FIG. 11B, correction values I' of the (n+1)th nozzle and the (n−1)th nozzle are changed to I+Ix/2. Here, I represents the correction value before being changed and Ix represents the correction value before being changed of the nth nozzle that has become the non-ejectable nozzle. However, in a case where I' exceeds the maximum value (in the example in FIG. 11A and FIG. 11B, 255) of the tone value, I' is clipped to the maximum value. The correction values are changed so that the density that has originally been in the charge of the non-ejectable nozzle is made up for by the peripheral nozzles adjacent to the non-ejectable nozzle. As a result of that, the number of dots or the dot size on the periphery of the non-ejectable nozzle increases, and thereby, it is possible to suppress a white spot caused by the non-ejectable nozzle.

Next, at S1004, for the printing-target image after the color conversion, the correction processing using the changed correction table is performed in the correction processing unit 302. Details of the correction processing will be described later. At S1005 that follows, for the corrected printing-target image, the halftone processing is performed in the HT processing unit 303. Then, the generated halftone image data is sent to the image forming apparatus 12 via the external I/Fs 110 and 112.

Next, at S1006, in the printing module 107 of the image forming apparatus 12, printing using the halftone image data received from the image processing apparatus 11 is performed and the image designated by a user is formed on a sheet. At this time, the value of the counter Cn_p described previously is incremented (+1). In a case where one sheet is printed and output, the processing advances to S1007.

Then, at S1007, whether or not printing of the number of sheets to be output N, which is set at S1001, is completed is determined. Specifically, whether or not the value of the counter Cn_p is equal to the value of the number of sheets to be output N is determined. In a case where the value of the counter Cn_p is equal to the value of the number of sheets to be output N, this printing processing is terminated. On the other hand, in a case where the value of the counter Cn_p is not equal to the value of the number of sheets to be output N, the processing advances to S1008.

At S1008, whether or not the value of the counter Cn_p has reached a predetermined number of sheets determined in advance is determined. Here, the predetermined number of sheets that is used as a threshold value is, for example, a multiple of 200 or the like. In a case where the value of the counter Cn_p has reached the predetermined number of sheets, the processing returns to S1002 and the detection of a non-ejectable nozzle, the change of the correction table, and the correction processing based on the changed correction table are performed again. On the other hand, in a case where the value of the counter Cn_p has not reached the predetermined number of sheets, the processing returns to S1006 and printing is continued.

The above is the contents of the printing processing according to the present embodiment. By performing the non-ejectable nozzle detection processing each time a predetermined number of sheets is printed, it is possible to deal with even a case without a break where a non-ejectable nozzle occurs during printing. Further, the correction table is created in advance so that the influence of a non-ejectable nozzle is not included, and therefore, in a case where the non-ejectable nozzle recovers, it is possible to correct the density that is in the charge of the nozzle and the peripheral nozzles without the need to create the correction table again.

It is premised that the density correction information generation processing to create the correction table is performed before the start of the printing processing, but it is not necessary to perform the density correction information generation processing each timer prior to the input of printing instructions by a user and it is sufficient to perform the density correction information generation processing at timing at which a predetermined time elapses or a predetermined number of processed sheets is reached. Alternatively, it may also be possible to perform the density correction information generation processing based on a predetermined event, such as exchange of the print head and turning on/off of the electric power source of the image forming system. Further, in a case where the designated number of sheets to be output is very large, it may also be possible to perform the density correction information generation processing as interrupt processing at the point in time at which a predetermined time (for example, two hours) elapses or a predetermined number of processed sheets (for example, 1,000 sheets) is reached.

<Density Correction Processing>

Figure 12:
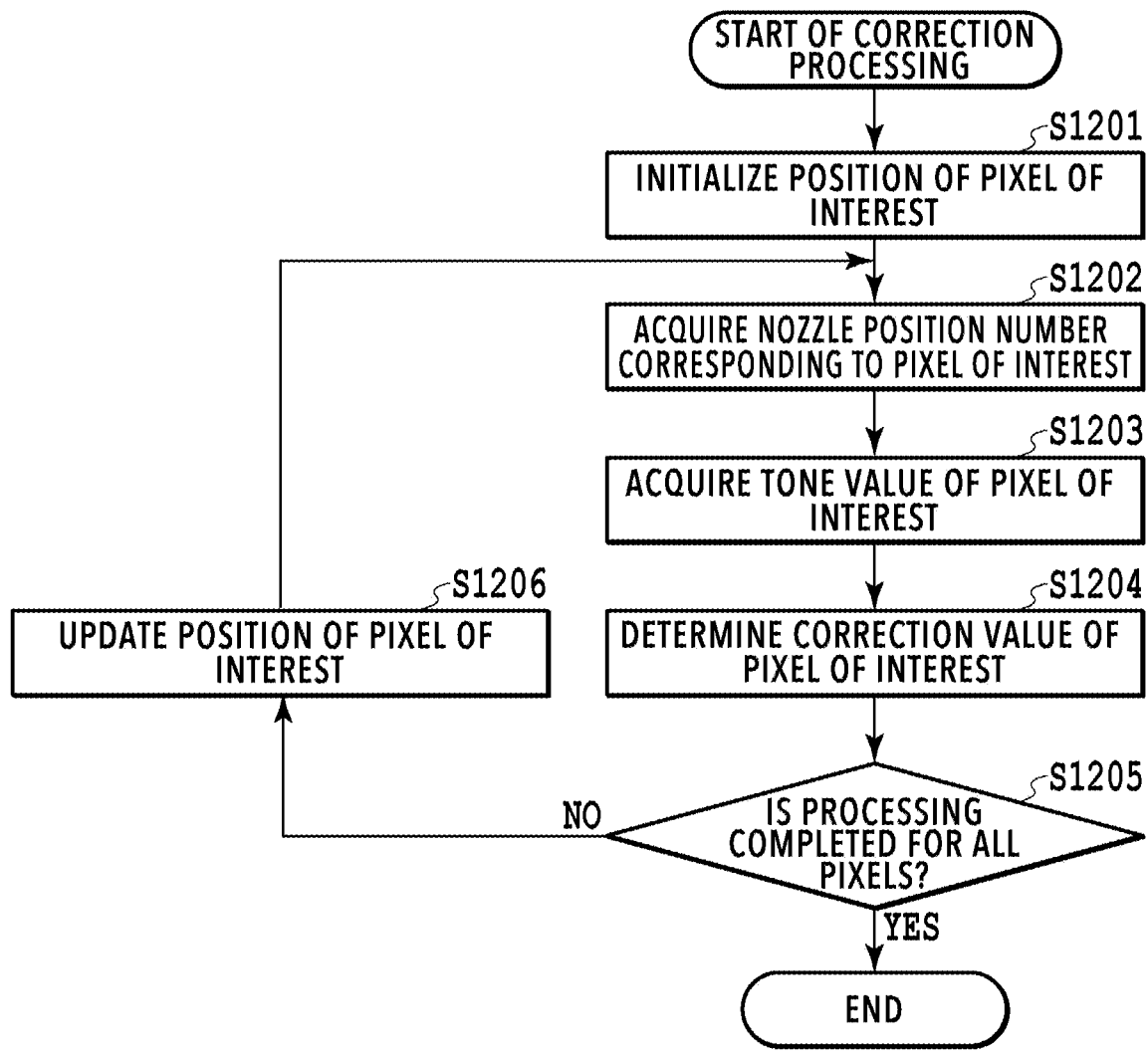
FIG. 12 is a flowchart showing a flow of correction processing.

Next, details of the above-described correction processing (S1004) are explained by taking a case as an example where the changed correction table shown in FIG. 11B is used. FIG. 12 is a flowchart showing a flow of processing in the correction processing unit 302. In the following, a detailed explanation is given along the flow in FIG. 12.

First, at S1201, the position of the pixel of interest in the converted image data after color conversion, which is the processing target, is initialized. Due to this, for example, the pixel at coordinates (x, y)=(0, 0) in the converted image after color conversion is determined as the first pixel of interest.

Next, at S1202, a nozzle position number x corresponding to the pixel of interest is acquired. For example, in a case where the dot at the position of the pixel of interest (x, y)=(1, 1) is formed by the nozzle whose nozzle position number is 1, the corresponding nozzle position number x=0 is acquired.

Next, at S1203, from the converted image data after color conversion, a tone value i of the pixel of interest is acquired. At S1204 that follows, a correction value (output tone value) i' of the pixel of interest is determined based on the changed correction table. Specifically, the correction value i' corresponding to the nozzle position number x acquired at S1202 and the tone value i acquired at S1203 is determined with reference to the changed correction table. Here, it is assumed that the tone value i of the pixel of interest is 32. Here, the determination is performed in accordance with the correction table in FIG. 11B, and therefore, in a case where the nozzle position number x is 1, the correction value i' is 34 and in a case where the nozzle position number x is n, the correction value i' is 0. In a case where the corresponding tone value does not exist within the correction table, for example, such as a case where i=48, it is sufficient to determine i' to be 52 by performing linear interpolation processing.

Next, at S1205, whether or not the correction value is determined for all the pixels in the converted image data after color conversion, which is the processing target, is determined. In a case where the correction value is already determined for all the pixels, this correction processing is terminated. On the other hand, in a case where a pixel for which the correction value is not determined yet exists, the processing advances to S1206 and the position of the pixel of interest is updated. After the updating, the processing returns to S1202 and the determination of the correction value for the new pixel of interest is continued.

The above is the contents of the correction processing based on the correction table.

As above, in the present embodiment, the output of the density characteristic acquisition chart is performed a plurality of times until the condition that the non-ejectable nozzle is no longer detected is satisfied. By repeatedly performing the chart output until the non-ejectable nozzle is no longer detected in this manner, the appropriate correction values for all the nozzles configuring the nozzle column are obtained and the correction table not including the influence of the non-ejectable nozzle is created. The created correction table does not include the influence of the non-ejectable nozzle, and therefore, even in a case where the non-ejectable nozzle recovers, it is not necessary to create the correction table again, leading to suppression of the downtime and saving of the ink and the sheet required for output of a dedicated chart.

Second Embodiment

In the first embodiment, the correction table not including the influence of a non-ejectable nozzle is created by repeating the cleaning processing and the output of the density characteristic acquisition chart until a non-ejectable nozzle is no longer detected. In the second embodiment, a correction table not including the influence of a non-ejectable nozzle is created by obtaining temporary correction tables based on results of reading of a plurality of density characteristic acquisition charts in which non-ejectable nozzles occur at different positions and combining the temporary correction tables. Explanation of the contents common to those of the first embodiment, such as the system basic configuration, is omitted or simplified and in the following, contents of density correction information generation processing, which is a different point, are explained mainly.

Figure 13:
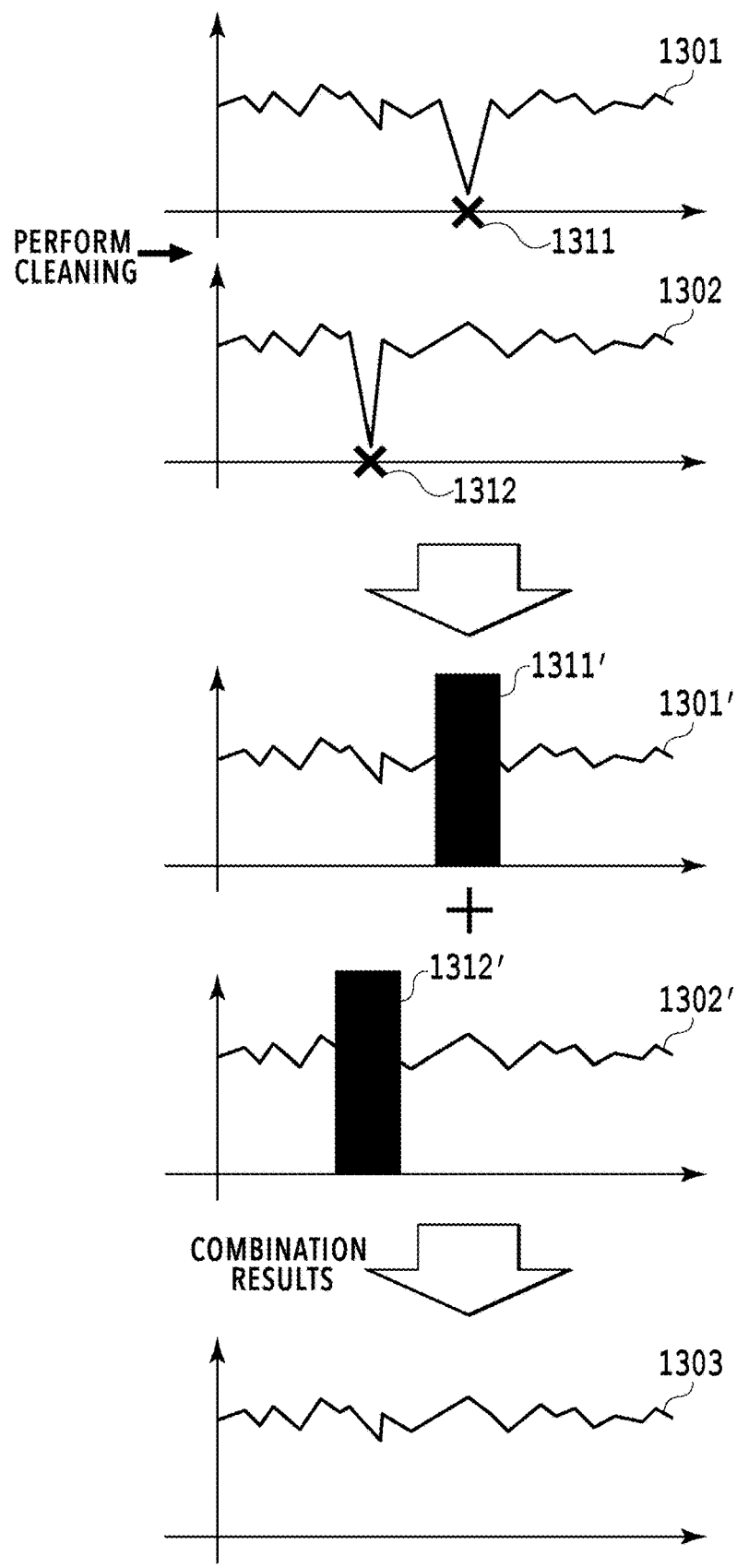
FIG. 13 is a diagram explaining a way of thinking of a second embodiment.

FIG. 13 is a diagram explaining a way of thinking in the present embodiment. Five graphs shown in FIG. 13 each show the nozzle column density characteristic and the horizontal axis represents the nozzle position in the nozzle column and the vertical axis represents the density (measured value described previously) on the paper surface in a case where the density patch of a predetermined tone is output. Then, in FIG. 13, lines 1301 and 1302 indicate two kinds of nozzle column characteristic obtained with cleaning processing being sandwiched in between. In this example, at the time of acquisition of each of the nozzle column characteristics 1301 and 1302, an ejection failure has occurred in the nozzles at nozzle positions 1311 and 1312 indicated by a x mark, respectively. Because of this, the density corresponding to the nozzle located at the x mark is extremely low compared to those of the other nozzles. In a case where the positions at which the non-ejectable nozzle has occurred are different with the cleaning processing being sandwiched in between as in this example, it is possible to acquire the ink ejection characteristic of the nozzle at the nozzle position 1311, which cannot be acquired from the nozzle column characteristic 1301, from the nozzle column characteristic 1302. Similarly, it is possible to acquire the ink ejection characteristic of the nozzle at the nozzle position 1312, which cannot be acquired from the nozzle column characteristic 1302, from the nozzle column characteristic 1301. That is, by combining two nozzle column characteristics 1301' and 1302' in which the peripheral portions of the non-ejectable nozzles are masked as indicated by rectangular areas 1311' and 1312' in FIG. 13, it is possible to obtain a nozzle column characteristic 1303 not including the influence of the non-ejectable nozzle.

In the present embodiment, based on the above-described way of thinking, a correction table not including the influence of a non-ejectable nozzle is obtained by combining a plurality of correction tables created in a situation in which non-ejectable nozzles have occurred at different positions, respectively, with the portions affected by the non-ejectable nozzles being excluded.

<Density Correction Information Generation Processing>

Figure 14:
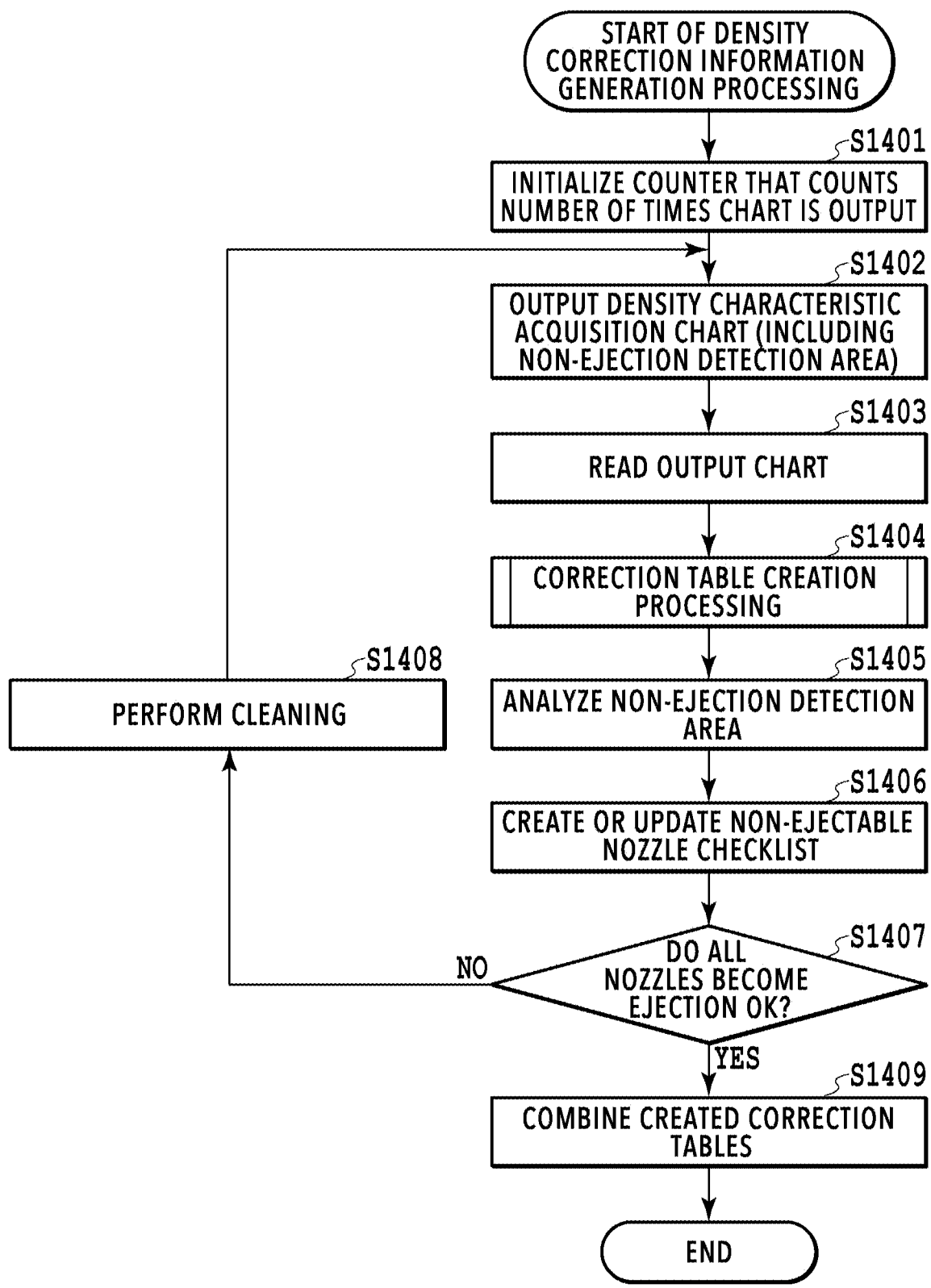
FIG. 14 is a flowchart showing a flow of density correction information generation processing according to the second embodiment.

Next, details of the density correction information generation processing according to the present embodiment are explained with reference to the flowchart in FIG. 14. As in the first embodiment, this processing is performed by the density correction information generation unit 305.

First, at S1401, a counter Cn_c that counts the number of times the density characteristic acquisition chart is output is initialized (count value=0). As the density characteristic acquisition chart in the present embodiment, a configuration including two kinds of area, that is, the non-ejection area 701 and the density patch area 702 as shown in FIG. 7 described previously is also used.

Next, at S1402, as at S601 of the first embodiment, the data of the density characteristic acquisition chart image described above is acquired from the external storage device 15 and transmitted to the printing module 107 along with printing instructions thereof. The printing module 107 having received the printing instructions forms the density characteristic acquisition chart image on a sheet and outputs the sheet. At this time, the value of the above-described counter Cn_c is incremented (+1). At S1403 that follows, as at S602 of the first embodiment, the density characteristic acquisition chart that is output from the printing module 107 is read by the image sensor 108 and a scanned image of the output chart is generated.

Next, at S1404, as at S606 of the first embodiment, a correction table is created by calculating, for each nozzle, the correction value corresponding to the input tone value from the scanned image acquired at S1403. The correction table that is created at this step is a temporary correction table that is a target of combination processing at S1409, to be described later, and therefore, in the following, called "temporary correction table".

Next, at S1405, as at S603 of the first embodiment, the non-ejection detection area 701 on the scanned image obtained at S1403 is analyzed and in a case where a non-ejectable nozzle is detected, the nozzle position thereof is specified.

Next, at S1406, based on the non-ejectable nozzle detection results at S1405, a non-ejectable nozzle checklist is created or updated. Here, the non-ejectable nozzle checklist is a list in which the nozzle position number and the count value of the counter Cn_c are associated with each other for the ink ejection state in each nozzle. FIG. 15 shows an example of the non-ejectable nozzle checklist. In the example shown in FIG. 15, one of information "○ (True): ejection OK" and information "x (False): ejection NG" is stored for each nozzle position number for each value of the counter Cn_c. For example, in the column of Cn=3, only the nozzle position number 4 is "x". This means that only the nozzle whose nozzle position number is 4 is detected as a non-ejectable nozzle and for the other nozzles, the ink ejection is checked normally in the results of the chart output for the third time. It is only necessary to know whether ejection is OK or NG for each nozzle, and therefore, "1 and 0" may be used in place of "○ and x". Alternatively, a list may be accepted that stores the nozzle position number of the nozzle whose ejection is OK for each count value of the number of times the chart is output.

Next, at S1407, whether or not ejection OK is achieved in all the nozzles is determined by referring to the non-ejectable nozzle checklist created or updated S1406. Specifically, in a case where at least one "○ (True)" is allocated to all the nozzles, it is determined that all the nozzles become ejection OK and the processing advances to S1409. On the other hand, in a case where a nozzle to which "○ (True)" is not allocated yet exists (in a case where there is even one nozzle to which "x (False)" is allocated for the value of each Cn), the processing advances to S1408.

At S1408, as at S605 of the first embodiment, the maintenance module 109 is instructed to perform cleaning processing and the cleaning processing is performed in the maintenance module 109. At the same time as that, the scanned image data of the chart read at S1403 is discarded. In a case where the cleaning processing is completed, the processing returns to S1402 and the processing at S1402 to S1407 is repeated again. As at S605 of the first embodiment, it may also be possible to design a configuration in which the number of times the cleaning processing at this step is performed is counted and in a case whether the count value exceeds a predetermined number of times, a user is notified of an error and the density correction information generation processing is not performed until, for example, the print head is exchanged with another.

At S1409 in a case where ejection OK is checked for all the nozzles, a correction table not including the influence of a non-ejectable nozzle is created by performing combination to selectively average two or more temporary tables created at S1404 for each nozzle. Specifically, the final correction value of each nozzle is determined by excluding the correction value in a case where "x (False)" is stored in the non-ejectable nozzle checklist for each nozzle position number and finding the average value of the remaining correction values. For example, in the example shown in FIG. 15 described previously, it is assumed that ejection OK is achieved in all the nozzles in a case where Cn=3. At this time, for the nozzle whose nozzle position number is 0, it is sufficient to take the value obtained by averaging all the correction values in the three temporary correction tables obtained by outputting the chart three times as the final correction value (output tone value) corresponding to each input tone value. Further, for the nozzle whose nozzle position number is 4, it is sufficient to exclude the correction value to which "x (False)" is allocated in a case where Cn=3, and find the average value of the two correction values obtained in a case where Cn=1 and Cn=2 and take the average value as the final correction value. Then, for the nozzle whose nozzle position number is 2, it is sufficient to take the correction value that is obtained in a case where Cn=3 as the final correction value as it is because "x (False)" is allocated in a case where Cn=1 and Cn=2.

The above is the contents of the density correction information generation processing according to the present embodiment. In a case where no non-ejectable nozzle is detected in the output results of the first chart (in a case where the results of the determination at first S1407 are Yes), it is sufficient to skip S1409 and output the temporary correction table created at S1404 as the final correction table.

Modification Example

The format of the non-ejectable nozzle checklist is not limited to the example described above. For example, at S1401, a list describing the nozzle position numbers of all the nozzles is prepared. Then, at S1406, the nozzle position numbers of the nozzles other than the nozzles detected as a non-ejectable nozzle at S1405 are deleted from the above-described list. Then, at S1407, it is determined that ejection OK is not achieved for all the nozzles in a case where even one nozzle position number remains in the above-described list. It may also be possible to determine whether or not all the nozzles become ejection OK by the method such as this.

Further, that it is not possible to detect a nozzle characteristic with a high accuracy on the periphery of a non-ejectable nozzle because of the influence of a white spot by the non-ejectable nozzle is known. Consequently, it may also be possible to allocate "x (False)" information also to the peripheral nozzles that are affected by the detected non-ejectable nozzle in the updating of the non-ejectable nozzle checklist at S1406. At this time, the range of the peripheral nozzles affected by the non-ejectable nozzle changes depending on the printing element characteristic, the ink characteristic, and the sheet characteristic, but generally in many cases, the range is the five nozzles to the left and the five nozzles to the right with the non-ejectable nozzle being taken as a center.

As above, according to the present embodiment, it is possible to create a correction table not including the influence of a non-ejectable nozzle in a shorter time and at a lower cost. Further, at the time of combining a plurality of temporary correction tables, the final correction value is determined by averaging the results based on the plurality of chart outputs, and therefore, the reading errors due to sensor noise, trash, scars and the like are reduced and it is possible to obtain a correction value of a higher accuracy.

Third Embodiment

In the first and second embodiments, the non-ejectable nozzle that exists at the time of chart output is specified by outputting the density characteristic acquisition chart including the non-ejectable nozzle detection pattern and analyzing the scanned image thereof. In the third embodiment, a correction table not including the influence of a non-ejectable nozzle is created by specifying a non-ejectable nozzle using a density characteristic acquisition chart not including a non-ejectable nozzle detection pattern. In the following, density correction information generation processing, which is a different point from the first and second embodiments, is explained and explanation of the system configuration and the like is omitted.

Figure 16A:
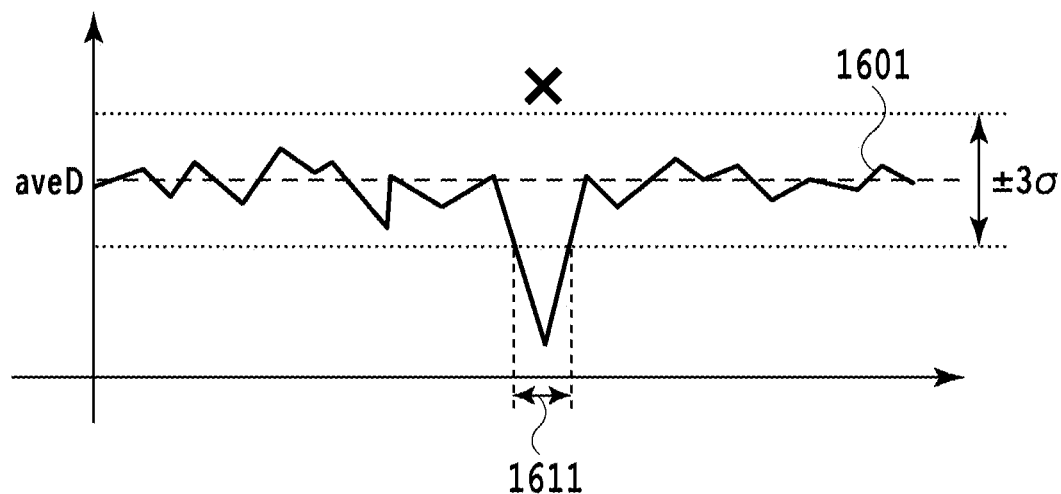
FIG. 16A and FIG. 16B are diagrams showing a way of thinking of a third embodiment.
Figure 16B:
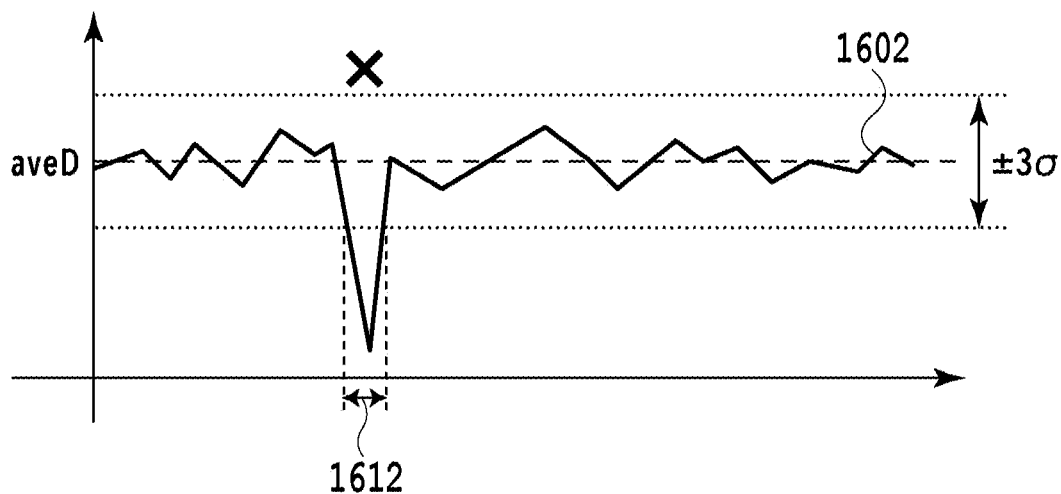

FIG. 16 is a diagram explaining a way of thinking in the present embodiment. As in FIG. 13 explained in the second embodiment, the horizontal axis of two graphs shown in FIG. 16 represents the nozzle position in the nozzle column and the vertical axis represents the average value (aveD) of the measured value indicating the density on the paper surface in a case where the density patch of a predetermined tone is output. Then, in FIG. 16, lines 1601 and 1602 indicate two kinds of nozzle column characteristic obtained with cleaning processing being sandwiched in between. In this example, at the time of acquisition of each of the nozzle column characteristics 1601 and 1602, aveD takes an extremely low value in a range indicated by bidirectional arrows 1611 and 1612, respectively, and it is estimated that no ejection occurs in the nozzle existing in the range. In the second embodiment, the non-ejectable nozzle is specified by outputting the chart including the non-ejection detection area 701 and analyzing the scanned image thereof, but in the present embodiment, a non-ejectable nozzle is specified by statistical processing from the nozzle column characteristics as shown in FIG. 16A and FIG. 16B. Specifically, the variance of the density values between nozzles in a case of aveD is taken to be a and the nozzle that is outside a range of, for example, aveD±3σ is specified as a non-ejectable nozzle. Alternatively, by taking into consideration that the density in a predetermined range with a non-ejectable nozzle being taken as a center is reduced (becomes bright) in a case where the non-ejectable nozzle occurs, it may also be possible to specify the nozzle whose density becomes lower than aveD−3σ as a non-ejectable nozzle. The processing after specifying a non-ejectable nozzle by the statistical processing such as this is the same as that of the second embodiment.

<Density Correction Information Generation Processing>

Figure 17:
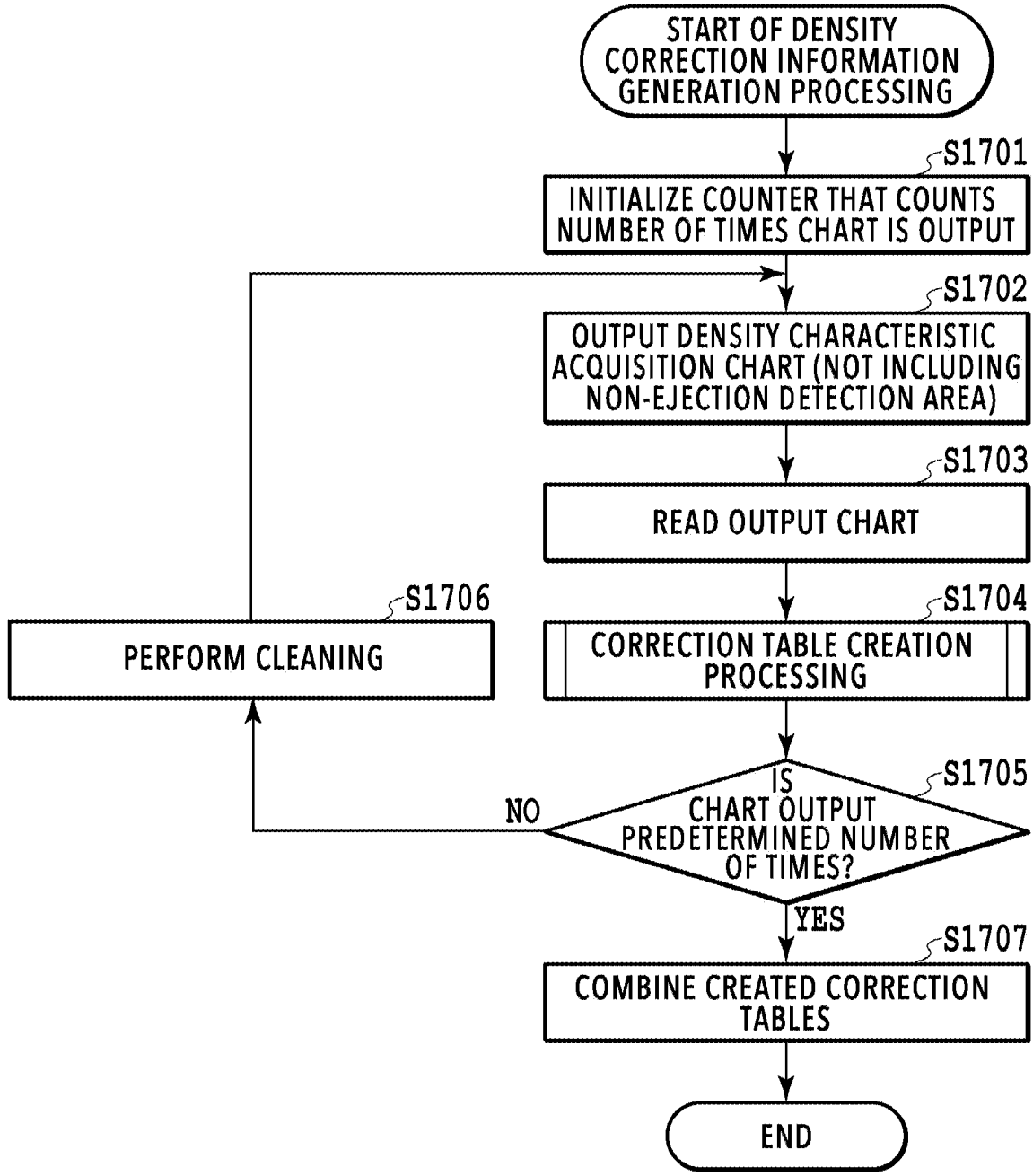
FIG. 17 is a flowchart showing a flow of density correction information generation processing according to the third embodiment.

Details of the density correction information generation processing according to the present embodiment are explained with reference to the flowchart in FIG. 17. As in the first and second embodiments, this processing is performed by the density correction information generation unit 305.

Figure 18:
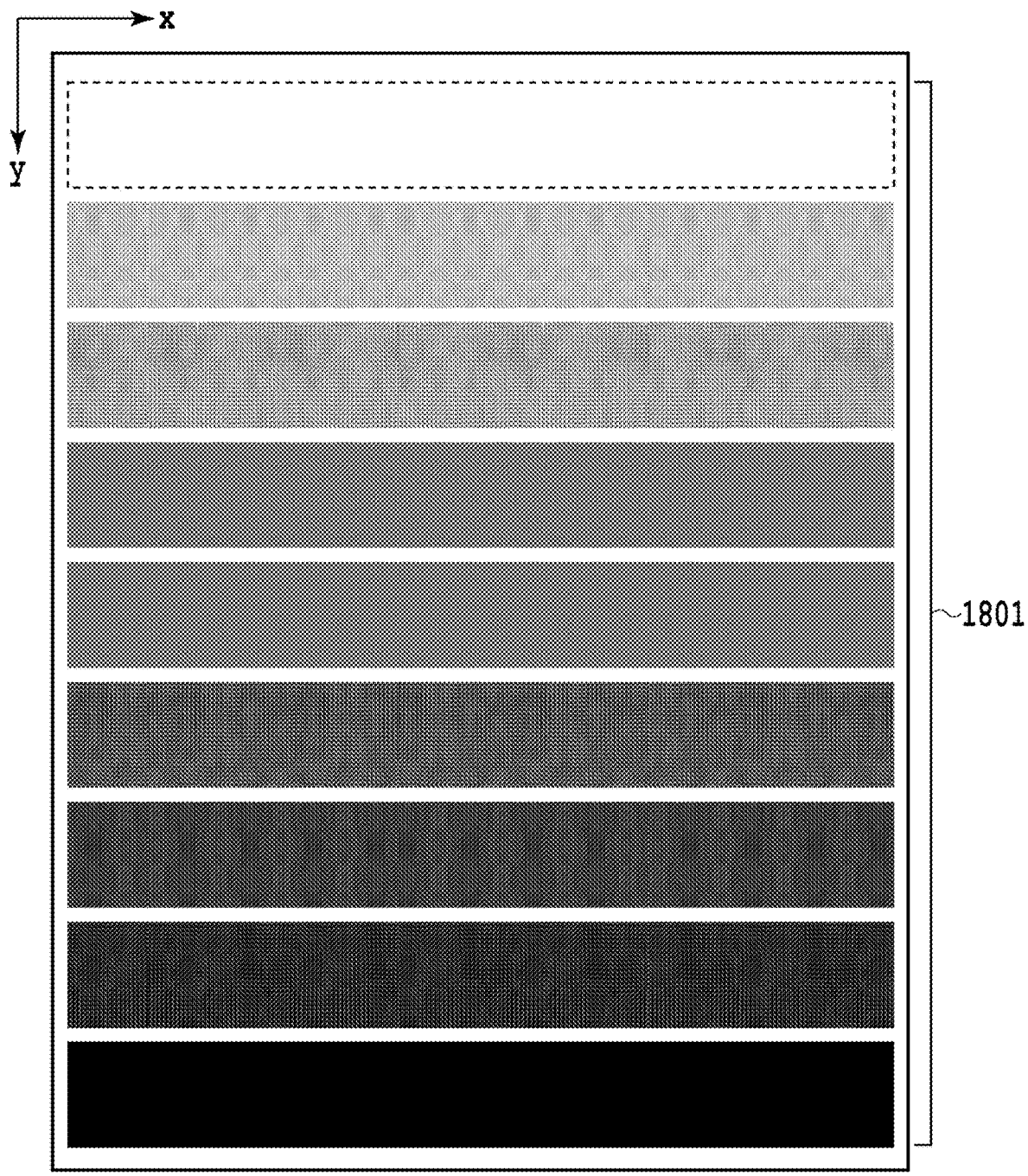
FIG. 18 is a diagram showing an example of a density characteristic acquisition chart.

First, at S1701, as at S1401 of the second embodiment, the counter Cn_c that counts the number of times the density characteristic acquisition chart is output is initialized (count value=0). FIG. 18 shows an example of the density characteristic acquisition chart in the present embodiment. Different from the density characteristic acquisition chart shown in FIG. 7 described previously, this density characteristic acquisition chart does not include a non-ejection detection area and includes only a density patch area 1801. Also in a case of the density patch area 1801 shown in FIG. 18, like the density patch area 702 in FIG. 7, nine kinds of rectangle patch having uniform density, in which the density is varied at nine levels, are formed.

Next, at S1702, the data of the density characteristic acquisition chart image described above is acquired from the external storage device 15 and transmitted to the printing module 107 along with printing instructions thereof. The printing module 107 having received the printing instructions forms the density characteristic acquisition chart image on a sheet and outputs the sheet. At this time, the value of the counter Cn_c described above is incremented (+1). At S1703 that follows, as at S602 of the first embodiment and S1403 of the second embodiment, the density characteristic acquisition chart that is output from the printing module 107 is read by the image sensor 108 and a scanned image of the output chart is generated.

Next, at S1704, as at S606 of the first embodiment and S1404 of the second embodiment, a temporary correction table is created by calculating the correction value for each nozzle, which corresponds to the input tone value, from the scanned image acquired at S1703.

Next, at S1705, with reference to the count value of the counter Cn_c, which is set at S1701, whether or not the density characteristic acquisition chart is output a predetermined number of times Np determined in advance (for example, Np=5) is determined. Here, it may be possible to appropriately set the predetermined number of times Np by taking into consideration the number of nozzles, the occurrence probability of non-ejectable nozzle, the recovery probability of non-ejectable nozzle by cleaning processing, the time that can be allocated to density correction information generation processing and the like. For example, the probability that a certain nozzle becomes a non-ejectable nozzle is taken to be P and the number of times the chart is output is taken to be C. In this case, a probability Pn that the nozzle ejects ink at least once out of C times is found as Pn=1−Pow (P, C). Here, Pow (x, y) is assumed to be a function that calculates x to the power of y. At this time, the minimum C that satisfies, for example, Pn>0.999 is taken as the predetermined number of times C. Alternatively, it may also be possible to take into consideration a number of nozzles Noz for Pn and determine the predetermined number of times Np so that Noz>0.99 holds by using a probability Pn'=(1−Pow (P, Np), Noz) that all the nozzles eject ink at least once. Further, a configuration can be accepted in which the predetermined number of times Np is increased in accordance with an increase in the occurrence probability of non-ejectable nozzle due to deterioration over time or a change in temperature or humidity. In a case where the determination results indicate that the value of the counter Cn_c is equal to the value of the predetermined number of times Np, the processing advances to S1707. On the other hand, in a case where the value of the counter Cn_c has not reached the value of the predetermined number of times Np, the processing advances to S1706.

At S1706, as at S1408 of the second embodiment, the maintenance module 109 is instructed to perform cleaning processing and the cleaning processing is performed in the maintenance module 109. At the same time as that, the scanned image data of the density characteristic acquisition chart read at S1703 is discarded. In a case where the cleaning processing is completed, the processing returns to S1702 and the processing at S1702 to S1705 is repeated again.

At S1707 in a case where the value of the counter Cn_c has reached the predetermined number of times, as at S1409 of the second embodiment, a correction table not including the influence of a non-ejectable nozzle is created by performing combination to selectively average the two or more temporary correction tables created at S1704 for each nozzle. At this time, in the present embodiment, first, the nozzle that can be regarded as a non-ejectable nozzle is specified by the above-described statistical processing. Then, by excluding the correction value of the specified nozzle from each temporary correction table and finding the average value of the remaining correction values, the final correction value (output tone value) corresponding to each input tone value is determined.

The above is the contents of the density correction information generation processing. It is only required to find the degree of the variation in data, and therefore, it may also be possible to use the standard deviation in place of the variance that is found by squaring the difference (deviation) between each measured value and the average value and averaging them.

Modification Example

Empirically, it is known that in a case where a non-ejectable nozzle occurs, the density of the nozzle and peripheral nozzles thereof is reduced (that is, becomes bright) as described previously. Consequently, it is also possible to create a correction table not including the influence of a non-ejectable nozzle by selecting the highest measured value among a plurality of measured values of each nozzle as the measured value of the nozzle based on the characteristic of each of a plurality of nozzles, which is obtained from a plurality of output charts.

Further, it may also be possible to take the value obtained by averaging a predetermined number (but, less than the number of times the density characteristic acquisition chart is output) of measured values from the highest (darkest) measured value for each nozzle as the measured value of the nozzle. For example, in a case where the number of times the chart is output is five, the value obtained by averaging the top four measured values is taken as the measured value of the nozzle, and so on. Here, it is assumed that the measured values on the uniform patch for a certain nozzle are as follows.

measured value in the first chart output: 1.0
measured value in the second chart output: 1.1
measured value in the third chart output: 0.9
measured value in the fourth chart output: 0.3
measured value in the fifth chart output: 1.0

In this case, the measured value in the fourth chart output is excluded and the average value of the four remaining measured values is found as (1.0+1.1+0.9+1.0)/4, and the measure value of the nozzle is determined to be 1.0.

It may be possible to determine how many measured values from the highest measured value to take as the target at the time of average value calculation based on the non-ejectable nozzle occurrence probability and it may be possible to determine the number of measured values as the maximum number of times the chart is output, with which the non-ejectable nozzle is not included statistically with a probability of 99% or higher, and so on.

Further, it may also be possible to obtain the density characteristic for each nozzle from the signal values (for example, RGB values) in a plurality of scanned images obtained by reading a plurality of charts. For example, the fact that the signal values of the non-ejectable nozzle and nozzles on the periphery thereof take values sufficiently large compared to that of the normal nozzle on the scanned image is assumed to be known. In this case, it is possible to obtain a correction table not including the influence of a non-ejectable nozzle by selecting the lowest signal value. Alternatively, it is also possible to similarly create a correction table not including the influence of a non-ejectable nozzle by finding the average of a predetermined number (for example, three) of signal values from the lowest value as a target among a plurality of signal values for each nozzle.

As above, according to the present embodiment, it is made possible to create a correction table not including the influence of a non-ejectable nozzle by using a density characteristic acquisition chart not including a non-ejectable nozzle detection pattern. In a case of the present embodiment, it is possible to increase the number of tones of the density patch by an amount corresponding to the non-ejection detection area within the chart, and therefore, it is possible to obtain a correction value of a higher accuracy. Further, even in a case where the ink ejection state of a certain nozzle changes within the same paper surface during the output of the density characteristic acquisition chart, it is possible to create a correction table by excluding the influence of the nozzle. For example, it is assumed that a nozzle that has been ejecting ink normally immediately after the start of the chart output becomes non-ejectable on the way and further, the ejection state thereof recovers during the output of the same chart. Even in the case such as this, it is only required to exclude only the density patch of the portion in which the non-ejectable nozzle has occurred in the chart from the target for finding an average, and therefore, it is possible to create a correction table more flexibly.

Other Embodiments

It is also be possible to apply the present embodiment to a method in which the printing module 107 comprises a multi-column head comprising a plurality of nozzles drawing the same position and a non-ejectable nozzle and a nozzle drawing the same position by the head different from the non-ejectable nozzle are selected as alternative nozzles.

Further, in the above-described embodiment, the density characteristic is used as the nozzle characteristic and the correction table is also created based on the density. However, for example, it may also be possible to acquire the characteristic of Y in the CIEXYZ color space or L* of CIELa*b* for each nozzle, and it may also be possible to create a correction table based on those characteristics.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to implement highly accurate density unevenness correction while suppressing a reduction in productivity of printing accompanying correction value calculation for density unevenness correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-063607, filed Mar. 31, 2020, which is hereby incorporated by reference wherein in its entirety.

What is claimed is:

1. An image processing apparatus for an image forming apparatus that prints an input image on a printing medium by using a print head including a plurality of printing elements, the image processing apparatus comprising:
   a processor; and
   a memory, including instructions stored thereon, which when executed by the processor cause the image processing apparatus to:
      acquire scan images obtained by scanning, a predetermined number of times, a chart including patches having uniform density for each tone;
      detect a non-printable element that cannot print color material normally; and
      correct a density of the input image based on density measured values of the scan images, which correspond to a printing element that is not detected as the non-printable element among the density measured values of the scan images obtained by scanning the predetermined number of times.

2. The image processing apparatus according to claim 1, wherein
   the scan image includes information that specifies an output tone value for obtaining a target density in an input tone value for each printing element, and wherein the instructions, when executed by the processor, further cause the image processing apparatus to:
   perform correction based on information that specifies an output tone value for obtaining a target density in an input tone value for each printing element.

3. The image processing apparatus according to claim 1, wherein the instructions, when executed by the processor, further cause the image processing apparatus to:
   the correct unit corrects a characteristic indicating density on the printing medium of the input image, which corresponds to an input tone value of the input image.

4. The image processing apparatus according to claim 1, wherein
   the image forming apparatus comprises a cleaning unit for recovering a function of the print head, and
   wherein the instructions, when executed by the processor, further cause the image processing apparatus to:
   the correction unit causes cause the image forming apparatus to operate the cleaning unit each time the chart is output.

5. The image processing apparatus according to claim 1, wherein
   the chart is output repeatedly until the non-printable printing element is no longer detected.

6. The image processing apparatus according to claim 1, wherein the instructions, when executed by the processor, further cause the image processing apparatus to:
   acquire the scan images in which the non-printable printing element is not detected among images obtained by scanning a plurality of charts output from the image forming apparatus.

7. The image processing apparatus according to claim 4, wherein the instructions, when executed by the processor, further cause the image processing apparatus to:
   count a number of times a cleaning is performed; and notify an error in a case where the number of times the cleaning is performed exceeds a predetermined number of times.

8. The image processing apparatus according to claim 2, wherein the instructions, when executed by the processor, further cause the image processing apparatus to:
acquire a density characteristic of each printing element based on each of the scan images obtained by scanning the predetermined number of times;
generate temporary information corresponding to each of the scan images obtained by scanning the predetermined number of times based on the obtained density characteristic; and
generate the information by performing combination to selectively average the output tone values in a plurality of generated pieces of the temporary information for each printing element.

9. The image processing apparatus according to claim 8, wherein the instructions, when executed by the processor, further cause the image processing apparatus to:
count a number of times scanning is performed the predetermined number of times;
create a list indicating an operation state in each printing element based on detection results; and
generate the information by excluding a portion that is affected by the non-printable printing element from the plurality of generated pieces of the temporary information based on the list and then performing averaging for the rest thereof.

10. The image processing apparatus according to claim 9, wherein
the list is a list in which information indicating whether each printing element is the non-printable printing element and a count value are associated with each other.

11. The image processing apparatus according to claim 9, wherein
the portion that is affected by the non-printable printing element includes peripheral printing elements of the non-printable printing element detected.

12. The image processing apparatus according to claim 11, wherein
the list is a list in which information indicating whether each printing element is the non-printable printing element or a peripheral printing element and a count value are associated with each other.

13. The image processing apparatus according to claim 9, wherein
the output of the chart is repeated until each of the printing elements becomes a normal printing element in the output of the chart corresponding to one of count values in the list.

14. The image processing apparatus according to claim 2, wherein the instructions, when executed by the processor, further cause the image processing apparatus to:
count a number of times the chart is output; acquire the density characteristic based on each image obtained by scanning a plurality of charts output from the image forming apparatus, and
generate a plurality of pieces of temporary density correction information corresponding to each of the plurality of charts based on the density characteristic;
specify the non-printable printing element by statistical processing based on the density characteristic; and
generate density correction information from which influence of the non-printable printing element specified by the statistical processing is removed by performing combination to selectively average the output tone values in the plurality of pieces of the temporary density correction information.

15. The image processing apparatus according to claim 14, wherein
the statistical processing is processing to specify the non-printable printing element based on an average value of values indicating the density characteristic and a difference from the average value.

16. The image processing apparatus according to claim 14, wherein the instructions, when executed by the processor, further cause the image processing apparatus to:
generate the density correction information from which influence of a non-printable printing element is removed by excluding a portion that is affected by the non-printable printing element from the plurality of pieces of the temporary density correction information and then performing averaging for the rest thereof.

17. The image processing apparatus according to claim 16, wherein
the portion that is affected by the non-printable printing element includes peripheral printing elements adjacent to the non-printable printing element specified by the statistical processing.

18. An image processing method for an image forming apparatus that prints an input image on a printing medium by using a print head including a plurality of printing elements, the image processing method comprising:
acquiring scan images obtained by scanning, a predetermined number of times, a chart including patches having uniform density for each tone;
detecting a non-printable printing element that cannot color material normally; and
correcting a density of the input image based on density measured values of the scan images, which correspond to a printing element that is not detected as the non-printable printing element among the density measured values of the scan images obtained by scanning the predetermined number of times.

19. A non-transitory computer-readable storage medium storing a program for causing a computer to perform an image processing method for an image forming apparatus that prints an input image on a printing medium by using a print head including a plurality of printing elements, the image processing method comprising:
acquiring scan images obtained by scanning, a predetermined number of times, a chart including patches having uniform density for each tone;
detecting a non-printable printing element that cannot print color material normally; and
correcting a density of the input image based on density measured values of the scan image, which correspond to a printing element that is not detected as the non-printable printing element among the density measured values of the scan images obtained by scanning the predetermined number of times.

* * * * *